United States Patent

Carmello et al.

[11] Patent Number: 5,809,118
[45] Date of Patent: Sep. 15, 1998

[54] SYSTEM AND METHOD FOR TRIGGERING ACTIONS AT A HOST COMPUTER BY TELEPHONE

[75] Inventors: Salvatore Carmello, Streetsboro; Richard Vesel, Hudson, both of Ohio

[73] Assignee: Softell

[21] Appl. No.: 663,462

[22] Filed: May 30, 1996

[51] Int. Cl.⁶ .................................................. H04M 11/00
[52] U.S. Cl. ................................. 379/102.02; 379/93.02; 379/93.26
[58] Field of Search .......................... 379/102.01–102.04, 379/102.07, 106.01, 93.26, 93.02

[56] References Cited

U.S. PATENT DOCUMENTS

| | | |
|---|---|---|
| 3,984,637 | 10/1976 | Caudill et al. . |
| 4,006,316 | 2/1977 | Bolgiano . |
| 4,051,326 | 9/1977 | Badagnani et al. ................ 379/102.04 |
| 4,206,444 | 6/1980 | Ferlan . |
| 4,484,306 | 11/1984 | Kulczyckyj et al. . |
| 4,604,499 | 8/1986 | Hughes . |
| 4,647,721 | 3/1987 | Busam et al. . |
| 4,701,946 | 10/1987 | Olivia et al. . |
| 4,723,269 | 2/1988 | Summerlin . |
| 4,922,521 | 5/1990 | Krikke et al. . |
| 5,131,025 | 7/1992 | Hamasaki . |
| 5,198,806 | 3/1993 | Lord . |
| 5,243,644 | 9/1993 | Garland et al. . |
| 5,355,365 | 10/1994 | Bhat et al. . |
| 5,410,713 | 4/1995 | White et al. ....................... 379/102.04 |
| 5,414,756 | 5/1995 | Levine . |
| 5,438,614 | 8/1995 | Rozman et al. . |
| 5,596,628 | 1/1997 | Klein ................................. 379/102.02 |

OTHER PUBLICATIONS

Newpoint™, Phone Director™ Telephone–Activated Power Control, Newpoint Corporation Spec Sheet date Aug. 1995.

Newpoint™, Operating Manuel for Phone Director™ Telephone–Activated Power Control, Newpoint Corporation (5 sheets).

*Primary Examiner*—Wing F. Chan
*Attorney, Agent, or Firm*—Jones, Day, Reavis & Pogue

[57] ABSTRACT

A system and method for remotely triggering a predetermined program at a host computer system using a telephone ring signal is disclosed. The host computer system includes a ring detection and triggering circuit, a control monitor program, and at least one activation script, wherein the activation script could be a series of commands which create a connection between the host system and the Internet. A ring signal on a phone line connected to the host system is detected by the ring detection circuitry, and subsequently a trigger signal is generated by a trigger circuit which is detected by the control monitor program running on the host system. The control monitor program responds to the trigger signal and executes the activation script, thereby causing a connection to be established between the host system and the Internet. Other features, such as multiple activation scripts, remote user authentication, and feedback validation tones are also disclosed. Further disclosed is a method of operating an ISP server computer for detecting whether a connection is being requested of a customer's host computer system, of determining whether the host computer system is presently connected to the Internet, and if the host system is not connected, of dialing a phone number which triggers an activation program stored at the host system, thereby causing the host system to connect to the Internet so that it can be accessed.

16 Claims, 8 Drawing Sheets

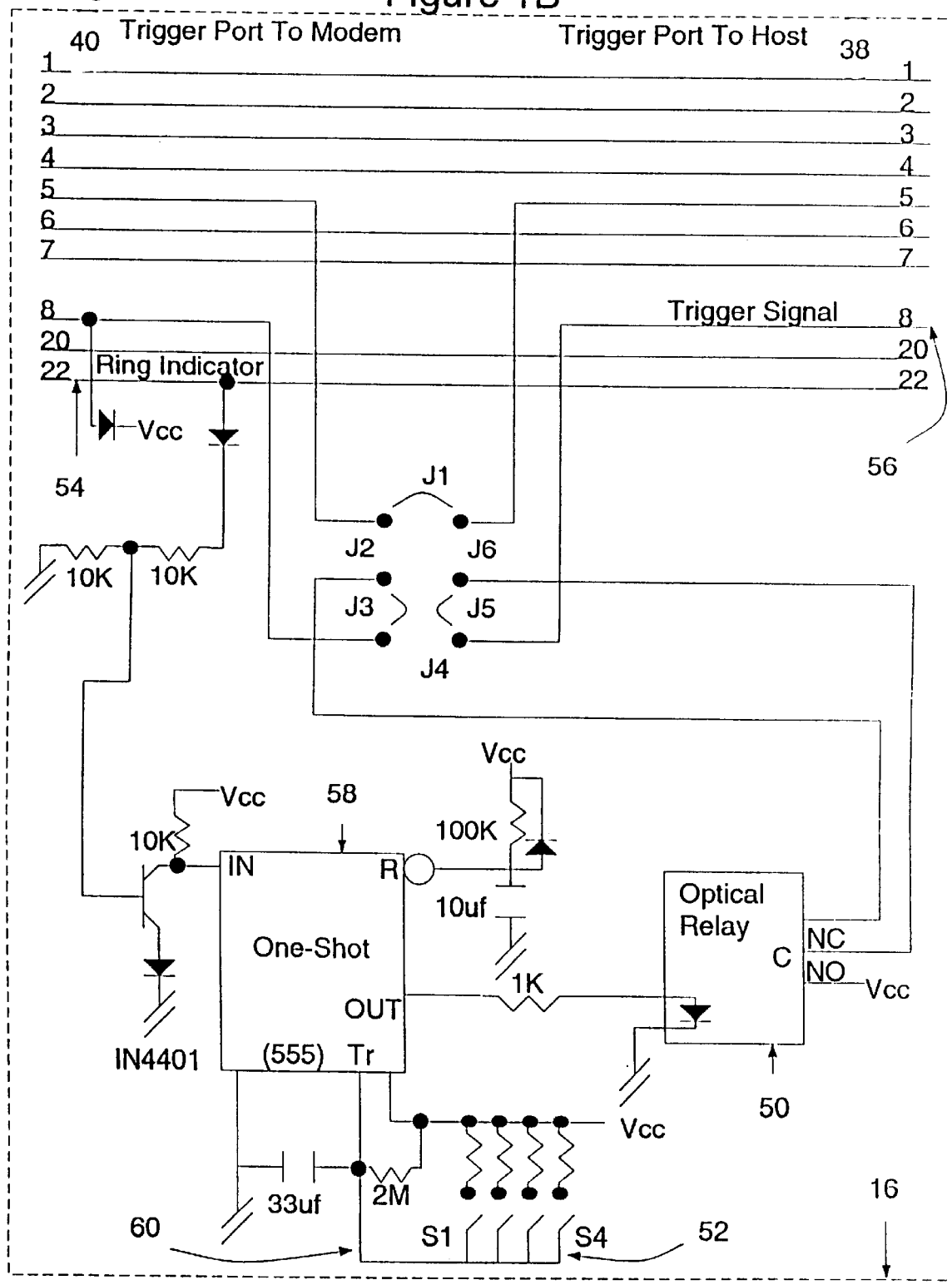

Control Signal Monitor State Diagram

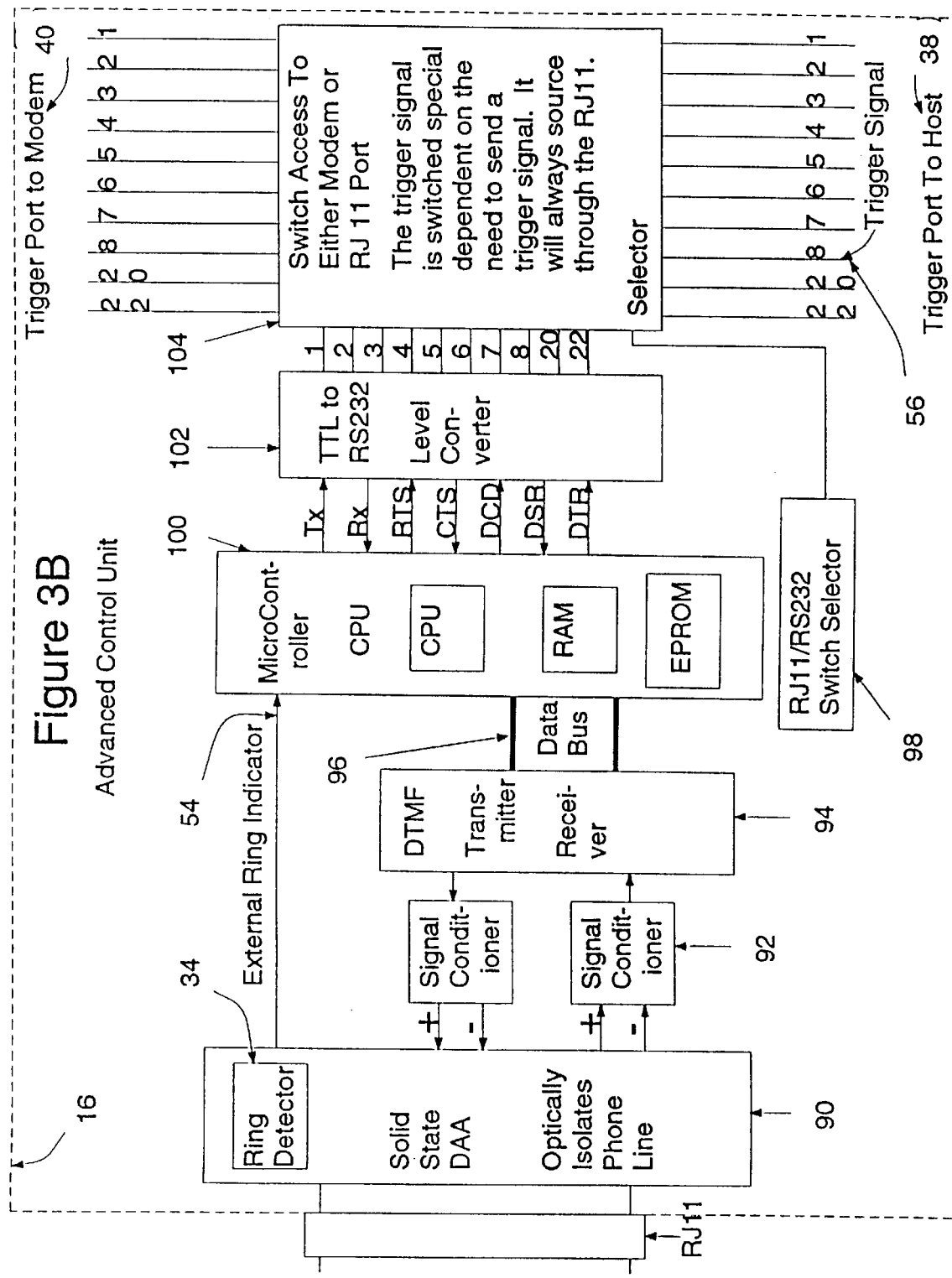

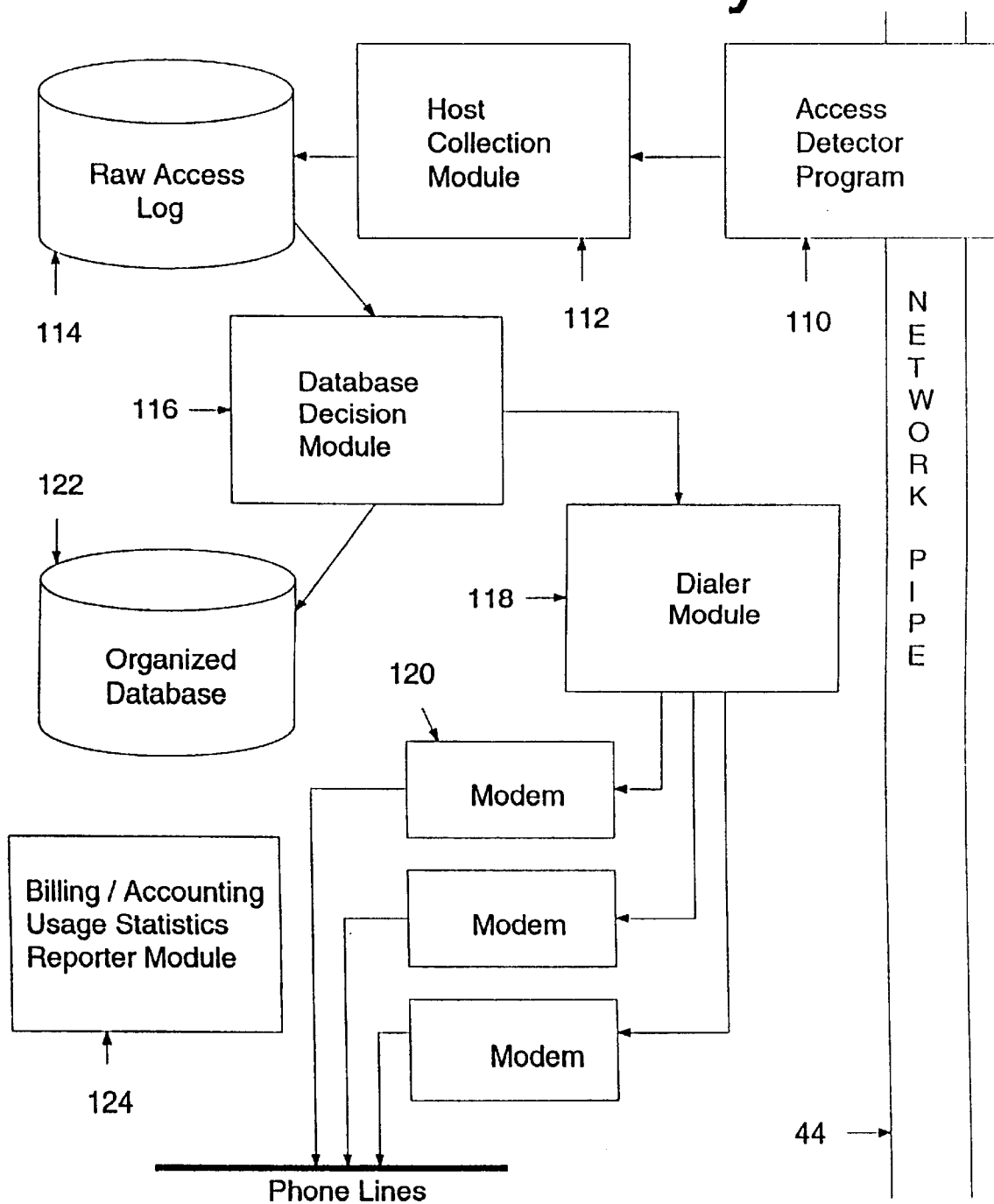

ISP Host Service

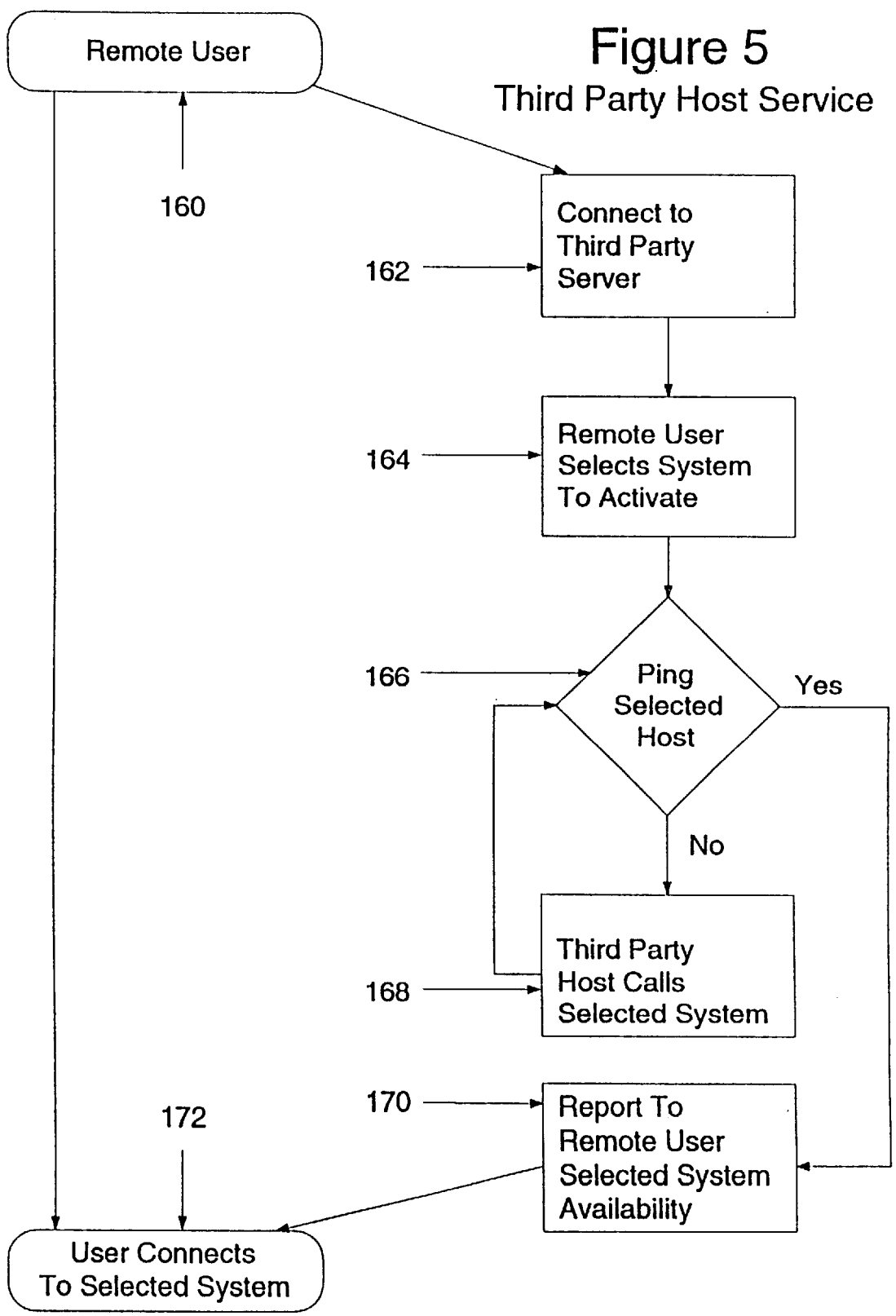

SYSTEM AND METHOD FOR TRIGGERING ACTIONS AT A HOST COMPUTER BY TELEPHONE

BACKGROUND OF THE INVENTION

The present invention is directed toward the field of remotely controlling the actions of a host computer system using a telephone connection, particularly in triggering a predetermined program, sequence of events, or series of actions at the host system. Such a sequence of events could be, for example, a script of commands which cause the host computer system to connect to the Internet for subsequent access by a remotely located user.

Recently, there has been a proliferation of computer systems that are connected to the Internet, the global information network. Most of the services available on the Internet are provided by large organizations, such as Government, University, and large corporations. These institutions have the capital and resources to spend on high-powered server computers with corresponding dedicated links to the Internet. These dedicated links range in bandwidth from 56KB for an ISDN (Integrated Services Digital Network) line to 1.5MB for a full T1 line. Such links are typically dedicated connections to an Internet Service Provider ("ISP"), where the ISP then provides a physical connection to the Internet. For small companies and individual users desirous of setting up a server to provide services, such as a World-Wide-Web ("Web") server, or an FTP (File Transfer Protocol) server, the costs of leasing and maintaining a dedicated connection to an ISP is prohibitive. Without a dedicated connection to the Internet, there is no means of providing on-demand access to remote users who want to take advantage of the services provided by the server. The present invention overcomes this problem by providing a system and method for controlling the actions of a host computer system using a simple telephone call, and in particular, for triggering a host computer system to make a connection to a computer network, such as the Internet, whereupon a remote user, or multiple remote users, can then connect to the host system over the network, thereby circumventing the need for a costly dedicated connection to an ISP.

Previous systems for controlling a host computer system over a telephone connection are limited to two basic concepts: (1) remote power-up; and (2) remote access. The remote power-up systems include a circuit which detects a telephone call and applies power to the host computer. According to these prior art systems a telephone ring detector and power switch are interposed between the power outlet and the remote computer system to be activated. When a telephone call is detected on the phone line connected to the ring detector, the power switch is activated and the host computer's power supply is connected to the power outlet. One disadvantage of these prior art systems is that they are limited to simply powering up the computer. These systems do not provide any mechanism, signal, or intelligence which causes the host computer to perform a sequence of predetermined actions based on the detection of the phone call.

An additional disadvantage of these prior art systems is that there is no means to trigger a program, or programs, at the host computer system while the host system is activated, transparent to other users of the system. Furthermore, the remote power-up systems inherently disrupt any other users of the host system, and are therefore useful only for single-user computer systems, or Personal Computers (PC's).

Previous remote access systems permit a remotely located computer system to gain access to a host system through an authorization device, and thereafter to control the actions of the host system. According to these types of systems, a user at a remote location from the host computer system gains access over a telephone connection between the two computers. Each computer includes a modem for communication over the phone line. In order to selectively permit access to certain users, but deny access to others, these remote access systems require the use of special hardware on both ends of the telephone connection, wherein the special hardware is an access control device connected between the respective computer and modem on each end of the connection. The hardware devices perform authorization handshaking using special codes, and if the codes match, the hardware devices permit access to the modem resources connected to the two computers. After the hardware devices have performed the authorization handshaking, the user of the local system then accesses the host system and controls its operations directly, as though he were located at the host system.

These prior art remote access systems assume that the control of the host system is to be carried out by a local computer after access is authorized. One disadvantage of these systems is that they do not teach that a remote user can trigger a predetermined sequence of events at a host system using a ring signal on a phone line. For any control to occur in these systems, the host computer must actually answer the phone call and create a logical connection between the host and local systems.

An additional disadvantage of these systems is that they are limited to access by one remote user at a time per modem, since each remote user creates a dedicated phone line connection to the modem resource of the host system. The only way to circumvent this shortcoming is for the host system to provide a modem-pool of resources. Such a modem-pool can support multiple remote users, but increases the expense and complexity of the host system. These systems do not teach that multiple remote users can access the services of the host system simultaneously through a single communications link.

Another disadvantage of the previous remote access systems is their inherent bandwidth limitation. Because the remote access systems are limited to communication using modems on either end of the connection, the speed of communication will be limited to the speed of state of the art analog modems, which is currently 28.8Kbps. These systems do not teach the ability to create an Internet connection using TCP/IP (Transfer Control Protocol/Internet Protocol), such that the remote user could connect at a much higher bandwidth using, for example, a 56KB or 128KB ISDN connection, or even a full T1 1.5MB connection. The previous remote access systems are limited to analog modem communication.

Another prior art system combines the teachings of the remote access systems and the remote power-up systems by providing a remote power-up device that is triggered by a phone call, and which "boots" a computer system and causes an access control program stored in the "boot drive" to be activated. Like the other remote access systems, this system assumes that the control of the host system is to be carried out by a local computer. The host system is controlled only after the access software permits access to the local user by first answering the telephone call and then establishing a logical connection between the modem of the host system and that of the local computer. This system does not teach the triggering of a predetermined sequence of events at a host system using a telephone ring signal. In addition, this system requires two computer systems, one at either end of the connection, and also requires that the host computer system be powered down before any type of control or communication can take place. This system does not teach multiple-user remote access through a single communications device. Furthermore, this system is limited to analog modem communication, as above, and therefore cannot support high bandwidth communications.

Therefore, there remains a need for a system and method wherein a predetermined program, or sequence of events, can be triggered for execution at a host computer system using a telephone ring signal.

There remains a further need for such a system and method wherein the predetermined program is a script of commands which cause the host computer system to connect to the Internet.

There remains a further need for such a system and method wherein after the host computer system has made a connection to the Internet, a user at a remote location, or multiple users at multiple remote locations, can use local computer systems to connect to the host system and thereby gain access to the services of the host system.

There remains a further need for such a system and method wherein the host computer system can be triggered by a ring signal without effecting the other operations of the host computer.

There remains a further need for such a system and method wherein a plurality of predetermined programs are stored at the host system, and, following the ring signal, a trigger identification code is transmitted over the phone line by the remote user indicating which of the plurality of predetermined programs is to be executed.

There remains a further need for such a system and method wherein a user validation code is transmitted on the phone line after the ring signal by the remote user, and the host system authenticates the user validation code prior to executing the predetermined program.

There remains a further need for such a system and method which enables higher bandwidth connections to be created between remote users and host systems via the Internet, independent of analog modem technology.

In addition, there remains a need for a method of connecting a host computer system to the Internet based on a request for services by a remote user, such that the remote user can connect to the host system using a local computer, where the connection is caused by a third computer system that receives the request for services from the remote user, and which dials the phone number of a phone line connected to the host system.

There remains a further need for such a method where the third computer system is a server computer at an ISP site that services the host system, wherein the ISP server computer includes software modules that automatically detect requests for services by remote users, and which determine whether the host system is already connected to the network, and if not, which then generate a ring signal on a telephone line connected to the host system, thereby triggering the host system to connect to the Internet for access by the remote user.

There remains a further need for such a method where the third computer system is a network server that the remote user connects to, where the network server contains a list of host systems that can be connected to the Internet by the server, and where the remote user requests the services of a specific host system, wherein the network server then generates a ring signal on a telephone line connected to the specified host system and verifies that the host system has connected to the network.

SUMMARY OF THE INVENTION

The present invention overcomes the problem of having to lease and support a dedicated connection to the Internet, and meets the needs noted above by providing a system and method for controlling a host computer system using a telephone ring signal. In particular, the present invention provides a system and method for remotely triggering a predetermined program, or sequence of events, at a host computer system using a ring signal, wherein the sequence of events is, for example, a stored script of commands that cause the host system to connect to a computer network, such as the Internet. Using the present invention, a small company or individual can achieve the benefits of having their own Internet server computer without having to shoulder the expense and complexity of a dedicated link to an Internet Service Provider.

According to the present invention, a system and method is provided for triggering a predetermined program stored at a host computer system using a telephone ring signal, wherein the host system includes a ring detection and triggering circuit connected to a phone line for detecting a ring signal on the line, and for generating a trigger signal to the host system indicating that a ring signal has been detected. The host system receives the trigger signal and executes a predetermined program stored at the host system. The predetermined program could be, for example, an activation script of commands that create a connection between the host system and the Internet.

According to another aspect of the present invention, the host system includes a background executing control signal monitoring process that monitors an interface port of the host computer system, such as a serial port, waiting for a trigger signal indicating that a ring signal has been detected on the phone line, and subsequently causes the execution of at least one predetermined program stored at the host system.

According to another aspect of the present invention, multiple predetermined programs are stored at the host system, and in order to select which program is to be executed, a trigger identification code is transmitted after the ring signal by the remote user, the code indicating which of the multiple programs is to be executed.

According to another aspect of the present invention, a user validation code is transmitted after the ring signal by the remote user, and the host system then validates the user code and if the code is valid, the host system permits triggering of the predetermined program.

According to another aspect of the present invention, a method is disclosed for detecting the network address of a host computer system at an Internet Service Provider (ISP) site, for determining whether the host computer system is currently connected to the Internet, and if not so connected, for dialing a phone number associated with a phone line connected to the host system, thereby triggering the host computer system to execute a predetermined program which causes the host computer system to connect to the Internet.

According to another aspect of the present invention, a method is disclosed for a remote user to select and trigger a host system to connect to the Internet by connecting to a network server, such as a Web Server, wherein the Web Server includes a list of host computer systems that can be triggered for connection to the Internet by the network server, and wherein the remote user selects the host system to be triggered and the network server dials a phone number associated with a phone line connected to the host system, thereby triggering the host computer system to execute a predetermined program which causes the host system to connect to the Internet.

An advantage of the present invention over the prior art systems and methods is that it permits various remote users to gain access to the services of host computer systems without requiring that the host computer system be connected to a computer network, such as the Internet, using a costly dedicated communication link.

Another advantage of the present invention is that it enables a remote user to gain access to a host computer system without having to pay for long distance telephone charges associated with a direct connection, since the remote user can trigger the host system to connect to the Internet, and the remote user can then use a local computer to access the services of the host system. No long distance telephone link is required, and since the Internet is a global network, a remote user could be anywhere in the world, and could gain access to the host system without having to pay for a very expensive long distance telephone call.

Another advantage of the present invention is that it provides a method whereby Internet Service Providers (ISPs) can activate a host computer system automatically upon detection of a data packet which is intended for the host computer. Using this method, a remote user does not have to make a telephone call to trigger the host system to connect to the Internet, but instead sends data packets over the network as if communicating to a host system that has a dedicated link. These data packets are then detected by the ISP server computer at which the host computer has an account set up, and the server computer determines whether the host system is connected to the Internet. If the host system is not connected, the ISP rings a phone line connected to the host system, thereby triggering a connection to the Internet. To the remote user it therefore appears as though the host computer system has a dedicated link.

Alternatively, the present invention provides a method whereby a network server includes a list of host systems that can be triggered for connection to the Internet and a remote user connects to the network server and selects the host to be connected, whereupon the network server triggers the host to connect to the Internet. As in the previous method, this alternative method does not require the remote user to make a telephone call, i.e. in both methods it is unnecessary for the remote user to know the phone number of the host system.

As will be appreciated, the invention is capable of other and different embodiments, and its several details are capable of modifications in various respect, all without departing from the invention. Accordingly, the drawings and description are to be regarded as illustrative in nature and not restrictive.

BRIEF DESCRIPTION OF THE DRAWINGS

The above advantages will become apparent from the following description when read in conjunction with the accompanying drawings wherein:

FIG. 1B is a circuit diagram of a ring detection and triggering circuit according to the present invention;

FIG. 3B is a circuit diagram of an advanced ring detection and triggering circuit according to the present invention;

FIG. 4 is a block diagram of a system located at an Internet Service Provider (ISP) site that is used to detect and determine whether a host system is connected to the Internet, and if not connected, to dial the phone number associated with the host system.

FIG. 5 is a flow chart of an alternative method showing the selection, connection and verification steps of a remote user contacting a network server to trigger a specified host system to connect to the Internet.

DETAILED DESCRIPTION OF THE DRAWINGS

Figure 1A:
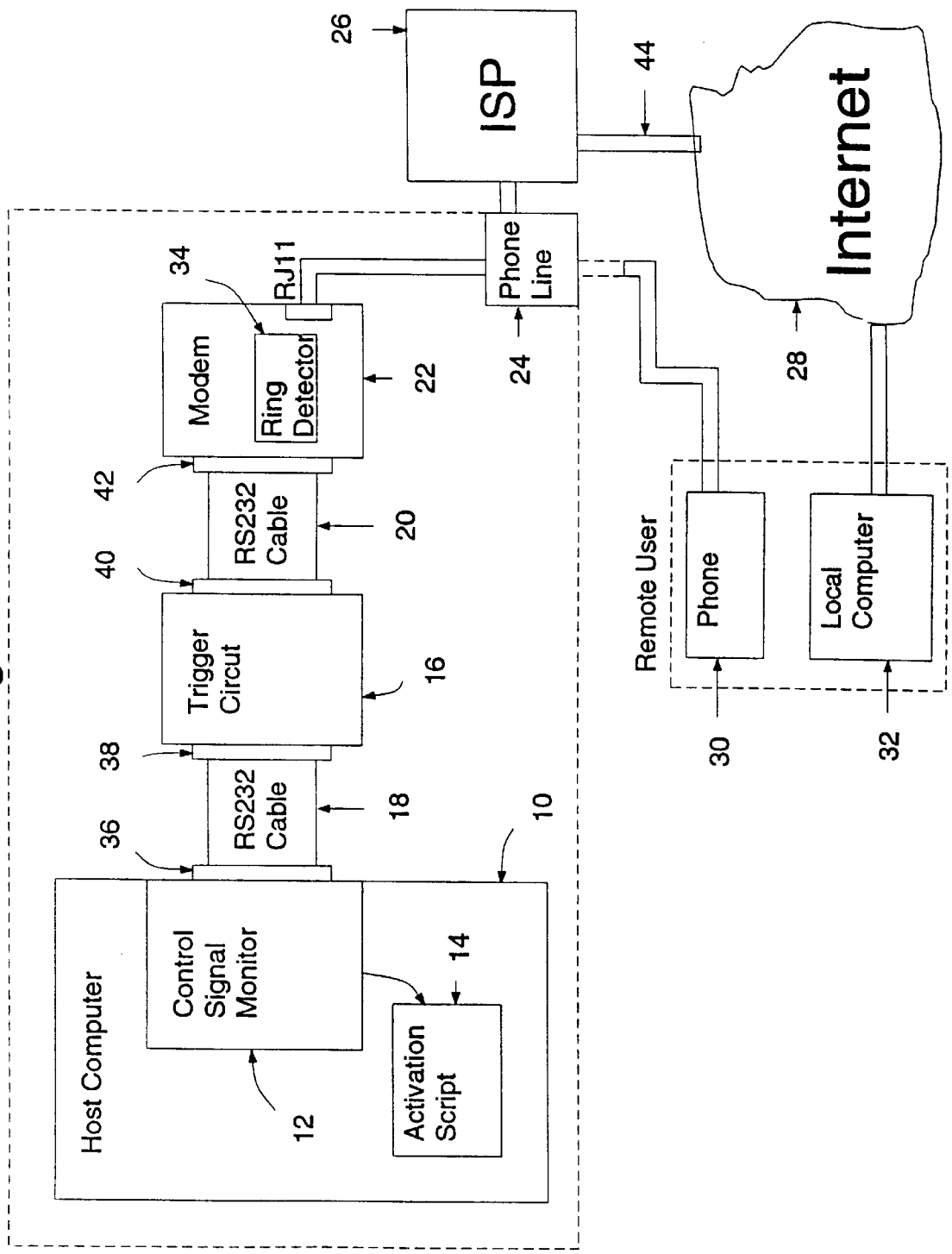
FIG. 1A is a block diagram of a system according to the present invention.

Referring now to the drawings, FIG. 1A shows a block diagram of a system according to the present invention. Block 10 is a host computer system, such as a personal computer, workstation, or mainframe computer system, and which preferably is operating a multi-tasking operating system, such as Unix, Microsoft Windows 95, or Microsoft Windows NT. The host computer system includes memory for storing a variety of applications, including a control signal monitor program 12, and at least one activation script 14. The control signal monitor program 12 is a background executing application that monitors a serial port, or other interface port, of the host system 36 for the presence of a trigger signal, and in response to the trigger signal causes the activation script 14 to be executed. The control signal monitor program is discussed more fully below in connection with FIG. 2.

Connected to one serial port 36 of the host computer 10 is a trigger circuit 16, discussed more fully below in connection with FIG. 1B. The trigger circuit has two ports, one port 38 connected to the serial port 36 of the host computer, and a second port 40 connected to a serial port 42 of the modem 22, also using a serial connection. The serial connections in FIG. 1A are preferably RS-232 connections, but could be any type of serial or other interface connection. Trigger circuit 16 is connected to the host computer system and the modem using respective wiring harnesses 18 and 20, which are preferably 25-wire connections, per the RS-232 standard. The modem 22 includes ring detector 34, and is connected to an external phone line 24 via a standard RJ11 phone jack.

In this embodiment of the present invention the ring detection function 34 is carried out internally within the modem 22. All standard modems have the ability to detect a ring signal on a telephone line, and generate a standard Ring Indicator (RI) signal on pin 22 of the 25-pin modem interface, which is preferably a standard RS-232 interface. The trigger circuit 16, discussed in more detail below, passes the majority of the modem signals on wiring harness 20 through to the serial port 36 of the host system directly, so that the host system can communicate over the phone line using the modem 22. The trigger circuit 16 responds to the Ring Indicator (RI) signal on pin 22 of the modem interface, and generates a trigger signal to the host system 10 using one of the pins of the standard RS-232 interface, preferably pin 8.

External to the host system is an Internet Service Provider (ISP) 26, which is preferably a server computer with a modem pool, and which provides dial-in and dedicated access to its customers in order to make a connection to the Internet 28. Also external to the host system is at least one remote user, where the remote user has access to a phone 30, and a local computer system 32.

The system according to FIG. 1A operates as follows. The remote user dials the phone number of the phone line 24 associated with the host computer system 10, causing a ring signal on the phone line 24. The ring detection circuit 34 of modem 22 detects the ring signal and passes this signal on to the trigger circuit 16. The trigger circuit 16 detects the ring signal from the ring detector 34 and generates the trigger signal to the host computer system 10 via the host computer system's serial port 36. The control monitor program 12 then detects the trigger signal on serial port 36 and causes the activation program 14 to be executed. The activation program 14 creates a connection through the modem 22 and ISP 26 to the Internet 28. The remote user can then make a connection to the host system 10 over the Internet 28 using local computer 32.

In this manner, a remote user can trigger a host computer system to connect to the Internet using a simple telephone ring signal, and thereafter, the remote user can connect to the host system over the Internet using a local computer, thereby dispensing with the need to have a dedicated link associated with the host system, and also dispensing with the need to pay for a long distance phone call. In addition, since the control monitor program is a background executing application, the actions of triggering the host system to make a connection to the Internet can occur without disrupting other users of the host system.

Referring now to FIG. 1B, a circuit diagram of the trigger circuit 16 is set forth. As discussed previously, the trigger circuit 16 has two ports, one port 38 connected to the host computer's serial port 36, and the second port 40 connected to the modem serial port 42. As set forth in FIG. 1B, the majority of the signals associated with the serial communications connection are simply passed through the trigger circuit 16, from the modem port 42 to the host computer port 36.

According to the RS-232 serial communications standard, pin 22 of the serial interface is the Ring Indicator (RI) signal. The RI signal is an active-high signal which is asserted when the ring detection circuitry 34 of the modem 22 detects a ring signal on the phone line 24.

Trigger circuit 16 monitors the RI signal 54 on pin 22, and feeds the signal into a one-shot timer 58, which is preferably a type 555 timer. When the RI signal 54 transitions from low to high on pin 22, the one-shot timer 58 generates a pulse on its OUT pin, wherein the duration of the pulse is determined by the external RC-network 60, and the resistor-switch network 52.

The resistor-switch network 52 is used to create pulses of varying duration, depending on the particular requirements of the host system. Certain host systems may require a longer trigger signal, and therefore in order to avoid having a custom trigger circuit for each type of host system, the resistor-switch network 52 is provided in order to accommodate various host computers. Using the resistor-switch network 52, the trigger pulse width can be preferably varied between 10 and 70 seconds.

The pulse from the one-shot timer 58 is fed into an optical relay 50, which is a normally closed, single-throw double-pole device. The output of the optical relay 50 is connected through jumper J5 to pin 8 on the host computer port 36, which is the trigger signal 56 to the host system. Using jumpers J1–J6, an alternative connection using pin 5 as the trigger signal 56 can be made. When the one-shot timer 58 is triggered by the transition on pin 22, the relay 50 is driven active, thereby opening the relay and connecting the relay output to a high voltage level. This level is maintained on the output of the relay until the one-shot timer 58 OUT signal returns to its inactive state. When this occurs, the relay 50 returns to its normally closed state, which then reconnects the trigger signal line on pin 8 straight through from the modem port 42 to the host computer port 36.

Figure 2:
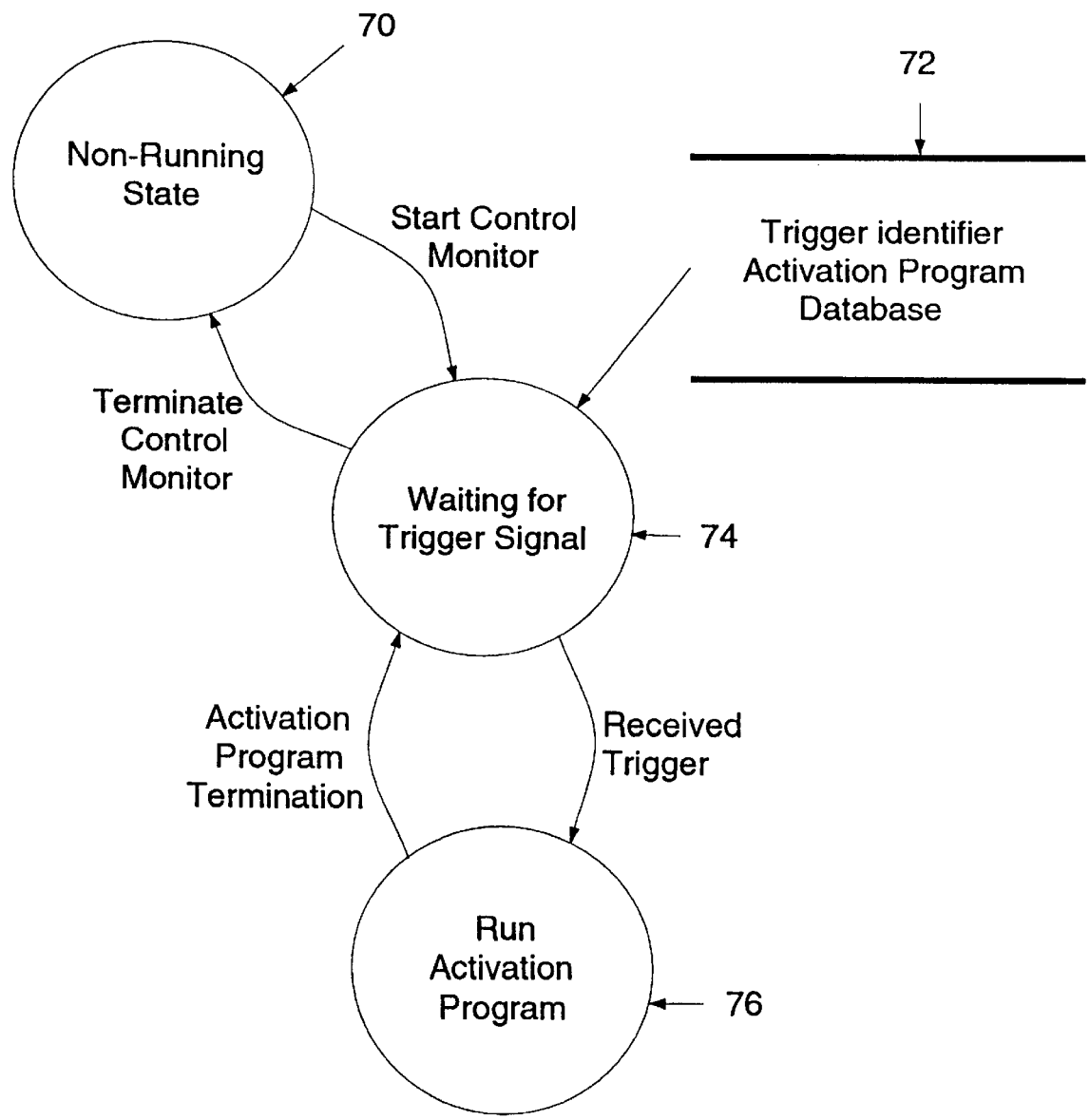
FIG. 2 is a data flow diagram of the control signal monitor program.

Referring now to FIG. 2, a data flow diagram of the control signal monitor program 12 is provided. Exemplary source code for the control signal monitor program 12 is set forth in this application as Appendix A. The control monitor program 12 begins in a non-running state 70. When the monitor program 12 is executed it enters a state 74 where it is constantly monitoring one of the serial ports 36 of the host computer system 10, waiting for the trigger signal 56, which in the present embodiment is pin 8 of the serial port 36. In the case of a system where there is only a single activation script 14, the control monitor detects the trigger signal 56 on the serial port 36 and causes the activation script 14 to be executed 76. When the sequence of commands that comprise the activation script 14 has been executed, the control monitor 12 returns to state 74 where it is waiting for another trigger signal.

In the case of a system where multiple activation scripts 14 can be triggered for execution (as set forth in FIG. 3A), the control monitor detects a trigger signal 56 at state 74, and then checks for a trigger identification value on the serial port 36 data lines. The trigger identification value indicates which script is to be executed, and is transmitted by the remote user when making the phone call to trigger the host system. The control monitor program 12 performs a "lookup" into store 72 which indexes the activation scripts 14 by trigger identification value in order to determine which script to execute.

The activation script 14 can be any sequence of commands which cause the host system 10 to perform some specified series of actions, but in the preferred embodiment is a sequence of commands which cause the host system 10 to make a connection through a communications device 22 to the Internet 28. Such command sequences are well known in the art of data communications, in particular in causing a host system to connect to a specific network, such as the Internet.

Figure 3A:
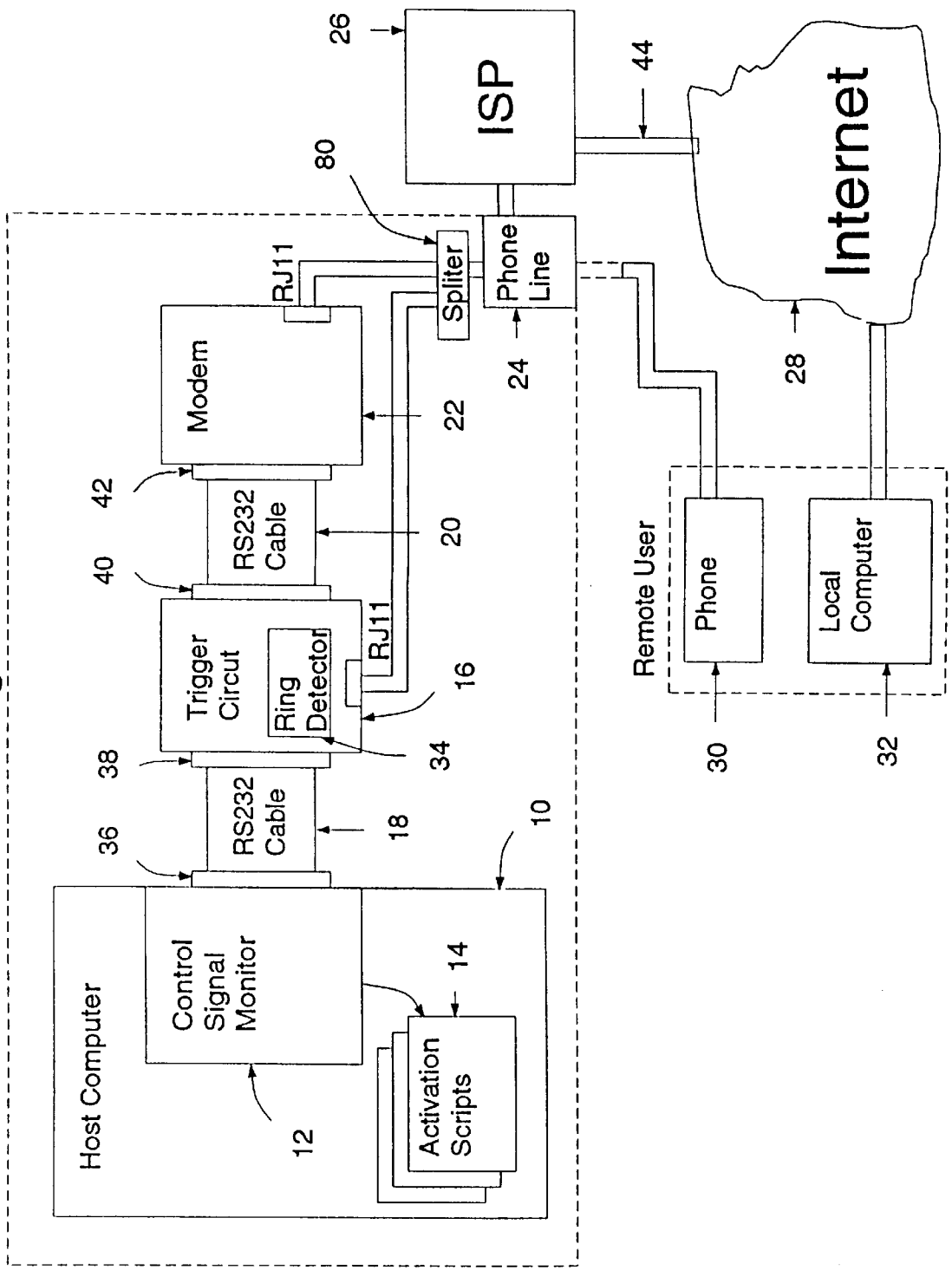
FIG. 3A is a block diagram of an advanced system according to the present invention.

Referring now to FIG. 3A, an advanced system according to the present invention is described. The system of FIG. 3A includes the same elements as that in FIG. 1, except that the ring detection function is carried out by the advanced trigger circuit 16A (discussed more fully below in connection with FIG. 3B), and a phone line splitter 80 is added which connects the phone line 24 to both the modem 22 and the advanced trigger circuit 16A using standard RJ11 phone jacks.

One advantage of this embodiment is that the communication device 22 does not have to be external to the host computer system 10, as shown, and the advanced ring detection and triggering circuit 16A can answer the phone call in order to process additional information transmitted by the remote user, such as a user validation code, or the trigger identification values discussed above. The preferred embodiment set forth in FIG. 3A shows the advanced triggering circuit 16A and an external modem 22. An alternative embodiment (not shown) would use an Internal modem within the host system 10, and there would therefore be no connection between the trigger circuit 16A and the external modem 22.

The operation of the advanced system in FIG. 3A is identical to that of the system in FIG. 1A, except that in the advanced system the ring detection and triggering circuit 16A performs internal ring detection 34, and includes circuitry that enables the circuit 16A to answer the phone line 24 and process additional information transmitted by the remote user, such as the user validation signals or the trigger identification value. In addition, the advanced ring detection and triggering circuit 16A has the ability to transmit DTMF (Dual Tone Multi-Frequency) tones back onto the phone line 24 in order to signal the remote user that the triggering operation has been carried out by the host system 10.

Referring now to FIG. 3B, the advanced ring detection and triggering circuit 16A is described. In the preferred embodiment this circuit is a three-port device, two ports 38, 40 for establishing the 25-pin RS232 serial connection between the host system port 36 and the external modem port 42, and a third port for connecting to the phone line 24 using a standard RJ11 phone jack. This three-port device has two modes of operation, standard and advanced.

The mode in which the advanced ring detection and triggering circuit 16A operates is selected using the RJ11/RS232 Selector Switch 98, which is a standard DIP switch. The signal from the RJ11/RS232 selector switch 98 is input to the model selector circuit 104, which routes the signal lines from either the modem input port 40 or from the internal microcontroller 100 onto the output port 38 which connects to the serial port of the host computer 36. In the standard mode of operation the circuit operates in the same fashion as the circuit of FIG. 1B. The serial lines from the modem port 42 are routed through selector circuit 104 onto the lines connected to host serial port 36. The difference between the operation in the standard mode and the operation of the circuit in FIG. 1A is that the ring detection is done in the advanced ring detection and triggering circuit 16A by ring detector 34 which generates an External Ring Indicator signal 54 to microcontroller 100. The microcontroller 100 senses this signal 54 and generates a trigger signal that is routed through selector circuit 104 onto pin 8 of the output port 38.

In the advanced mode of operation the signals from the internal microcontroller 100 are routed through the selector circuit 104 onto the output port 38 for connection with the host system serial port 36. This connection enables serial communication between the host system 10 and the microcontroller 100 of the advanced circuit 16A. In this mode of operation the external modem 22 is not used for making a connection to the Internet, but rather an internal communication device within the host system 10 is used to make the connection. This internal communication device (not shown) could be an analog modem, ISDN modem, or any other type of communication device. In the advanced mode of operation the advanced ring detection and triggering circuit 16A is capable of answering the phone line 24 and of processing additional signals transmitted by the remote user. In addition, the circuit 16A can transmit DTMF signals back to the remote user over the phone line 24.

These advanced features are carried out using the following circuit components: (1) solid state data access arrangement (DAA) 90; (2) signal conditioning circuits 92; DTMF transmitter and receiver 94; microcontroller 100; and TTL/RS232 level converter 102. The solid state DAA 90 includes ring detector 34, which detects a ring signal on the phone line 24 and asserts the External Ring Indicator signal 54 to the microcontroller 100. The solid state DAA 90 also provides standard interface and isolation circuitry required by the FCC for communication over a telephone line.

Signal conditioning circuits 92 convert the differential signals required for use by the DAA 90 into single ended signal levels compatible with the dual tone multi-frequency (DTMF) transmitter and receiver 94. The DTMF transceiver 94 receives signals from the DAA 90 in DTMF format and converts the signals into a digital format for transmission to the microcontroller 100 over databus 96. Likewise, the DTMF transceiver 94 receives a digital signal from the microcontroller 100 over databus 96 and converts the digital signal into a DTMF signal for transmission to the DAA circuit 90 which then asserts the DTMF tones onto the phone line 24. In this manner the microcontroller 100 can both send and receive standard DTMF signals on the external phone line 24.

Microcontroller 100 preferably includes a central processing unit (CPU) core, temporary storage, such as a random access memory (RAM), and permanent storage, such as an Erasable Programmable Read Only Memory (EPROM). The software that enables the microcontroller to: (1) handle the signal on the External Ring Indicator 54 line; (2) process the incoming DTMF signals transmitted by the remote user; and (3) determine what signals to transmit back to the remote user; is either permanently stored in the EPROM of the microcontroller, or is downloaded from the host system 10. In the later case, the EPROM only contains a small software kernel which, on power up, instructs the microcontroller 100 to download the software to control the advanced operations discussed above from the host system 10, via the serial connection 18.

The final circuit component depicted in FIG. 3B is the TTL/RS232 converter 102. The TTL/RS232 level converter 102 takes the 0–5V TTL signals from the microcontroller and converts them into the RS232 voltage levels that are part of the RS232 standard. This circuit simply boosts the TTL serial port voltage levels on the microcontroller to levels which are compatible with the RS232 standard. Alternatively, the serial connection could be an RS422 or RS485 connection, in which case a TTL/RS422 or TTL/RS485 level converter would be required.

The advanced ring detection and triggering circuit 16A operates as follows. When a phone call is detected by ring detector 34 an active signal level is asserted on the External Ring Indicator line 54 to the microcontroller 100. The software controlling the microcontroller causes the microcontroller to wait for this signal 54 to become active, and when detected the microcontroller 100 asserts an active level on the DCD (Data Carrier Detect) line which is routed through the TTL/RS232 level converter 102 and the router 104 onto pin 8 of the output port 38 to become the trigger signal 56. The trigger signal 56 is detected by the control monitor program 12 running on the host system 10, and the control monitor then waits for additional information to be transmitted over the serial port 36 from the advanced unit 16A.

After detection of the ring signal, the advanced ring detection and triggering circuit 16A then answers the phone line and looks for additional DTMF tones being transmitted from the remote user. These tones could represent either a user validation sequence, or a trigger identification value. The user validation signals are preferably a standard Unix-type "login/password" sequence, where, for example, the remote user transmits a multi-digit login number and a corresponding multi-digit password in the form of a series of DTMF tones.

These tones are received by the DAA 90, passed onto the DTMF transceiver 96 where they are converted from DTMF format to a digital word and transmitted to the microcontroller 100 over databus 96. The microcontroller 100 then preferably transmits the login/password sequence to the control monitor program via the serial communication port 38-36 for authorization. Host system 10 further includes a datafile of valid login/password sequences that is accessed by the control monitor program 12 in order to determine whether the transmitted sequence is valid. Alternatively, the login/password sequence could be authorized by the software stored in the advanced ring detection circuit 16A directly. In this alternative case the valid login/password sequences could be either stored permanently in the EPROM of the advanced circuit, or the microcontroller 100 could be programmed to access the datafile of valid login/passwords stored on the host system 10, using the serial communications port 38.

Assuming that the user validation signals are received, processed and then transmitted to the host system for verification, the host system then transmits a signal back to the advanced control unit 16A indicating that the remote user has been verified. The microcontroller 100 then examines the databus 96 to determine whether additional tones have been transmitted that represent the trigger identification value. As discussed above, the trigger identification value permits the selection of one of many scripts for execution by the host system 10. This trigger identification value is received by the microcontroller 100 and transmitted onto the host system 10 where the control monitor program reads the value from the serial port 36 and uses it as the index into store 72 to determine which activation script 14 to execute.

After the control monitor program 12 has executed the selected script 14, a signal is sent to the advanced control unit 16A indicating that a script has been triggered. The microcontroller 100 receives this signal and then transmits a specific tone or sequence of tones using the DTMF transceiver 96 and DAA circuit 90 back onto the phone line 24, indicating to the remote user that the selected script has been executed. In the preferred embodiment, the script 14 creates a connection between the host system 10 and the Internet 28, using an internal communications device (not shown) connected to the host system 10. The internal communications device could be another analog modem, or could be an ISDN digital communications device, and is connected over a phone line to an ISP, so as to create a connection to the Internet.

Using the advanced mode of operation, a remote user can trigger one or more of a plurality of scripts 14 stored at a host computer system 10, and can receive audible feedback from the system that the command has been executed. In addition, the advanced mode provides for security and user authentication through the verification of the user login/password validation signals optionally transmitted by the remote user.

Referring now to FIG. 4, a system for connecting a host computer system to a network based on a determination that the host computer is not presently connected to the network is set forth. The system of FIG. 4 includes a network connection, or pipe 44, to the Internet over which a multitude of data packets are being transmitted. Each data packet contains routing information, such as an IP address of a host system, or an EMAIL address of a particular user, or some other unique destination information that server computers connected across the network use to direct and route the packet to its destination.

The present invention uses this routing information in order to determine whether the destination computer, i.e. the host computer system, is connected to the network, and if a determination is made that the destination computer is not currently connected, a phone call is made to the host computer in order to trigger a connection to the network for subsequent delivery of the data packet. This triggering step assumes that the host system 10 has a triggering circuit according to FIGS. 1A or 3A, discussed above, that detects a signal on the corresponding phone line 24 and triggers a script of commands which cause the host system to connect to the Internet.

The ISP host server system includes a number of software and database components, a server computer, and a pool of modems. The ISP server computer is connected to the Internet via the network pipe 44, which could be a dedicated connection, such as a T1 or T3 high bandwidth telephone connection.

The ISP server includes an Access Detector Program 110, which is a software module that constantly monitors the destination information of data packets transmitted over the network pipe 44, and extracts the destination address information which corresponds to customers of the ISP. The information extracted by the Access Detector Program 110 is routed to a Host Collection Module 112 which is a software module that collects and stores the destination information of detected packets that correspond to customers of the ISP. This information is then routed to a Raw Access Log 114 where it is stored and time stamped so that the ISP server system knows when access to a customer's host computer system 10 has been requested.

In addition to the Raw Access Log 114, the ISP Host Server System includes an Organized Database 122, which stores a variety of information such as which ISP customers have paid for the remote triggering service, how many access requests for a particular host have been logged into the Raw Access Log, how many trigger signals have been generated, the phone numbers of customer host systems 10, billing information, etc.

The information stored in the Raw Access Log 114 and the Organized Database 122 is used by the Database Decision Module 116 to determine whether to trigger a specific host system 10 to connect to the Internet by dialing a phone number associated with the system. The Database Decision Module 116 examines the destination information stored in the Raw Access Log 114 and compares it with the information stored in the Organized Database 122. If destination information is detected which corresponds to a customer of the ISP referenced in the Organized Database 122, the Database Decision Module extracts the phone number of the host system 10 to be triggered from the Organized Database 122. The ISP server computer then dials the phone number associated with the customer's host computer system 10, using one of the modem's in the server modem pool 120, thus creating a ring signal on the phone line 24 connected to the host computer system 10. As depicted in FIGS. 1A, and 3A, this ring signal is detected by the host computer system 10, and causes an activation script 14 stored at the host computer system to be executed, wherein the activation script 14 creates a connection between the host computer system 10 and the Internet 28. Following the establishment of this connection, data packets designated for the customer's host computer system 10, can thereafter be routed to the host system.

Using the system described above, a customer of an ISP can maintain a host computer system that appears to have a dedicated link to the Internet even though in reality it does not, thus saving the customer the cost and complexity of maintaining a dedicated link. Using this system and method, the remote user, or users, do not need to know the phone number of the host system, as this information is retained at the ISP server.

Figure 4A:
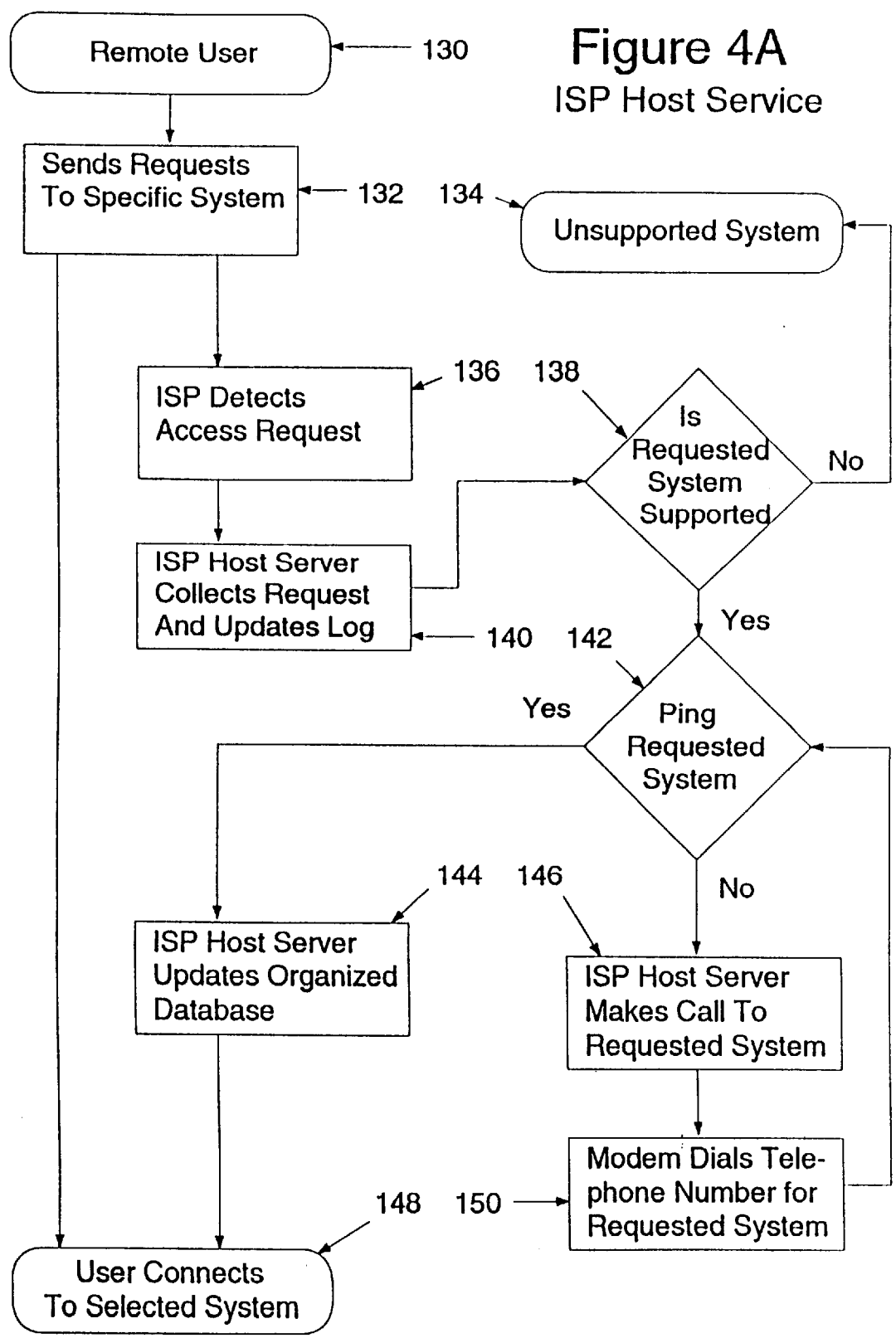
FIG. 4A is a flow chart of the steps carried out by the system located at the ISP of FIG. 4 which is used to detect and determine whether a host system is connected to the Internet, and if not connected, which dials the phone number associated with the host system.

Referring now to FIG. 4A, a flow chart of the steps carried out at the ISP Host Server System is set forth. In step 132, a remote user 132 transmits data packets with specific system destination information embedded in the packets over the Internet. These packets are routed by various other computer systems (not shown) and ultimately are directed to the ISP Host Server. If the destination host computer system is presently connected to the Internet, the user is simply connected to the host system in step 148 (i.e. the packets are directly routed to the host system).

However, if the host computer system is not presently connected to the Internet, then at step 136, the ISP Host Server detects the destination information corresponding to a request to access a specific host system. Following the detection of the destination information, the ISP Host Server collects this information and routes it to the Raw Access Log in step 140. Following the update to the Raw Access Log, the Database Decision Module 116 then determines, in step 138, whether the destination information corresponds to a host system that is supported by the remote triggering service of the ISP. If the requested host system is not supported, then in step 134 the ISP Host Server takes no additional action. To the remote user, this will appear as though the host system is simply not connected to the network. However, if the requested host system is supported by the ISP, then in step 142 a "ping" function is executed. The "ping" function is used to determine whether a particular system is presently connected to the Internet. This function is well known in the art of digital communications, particularly communications between computers via a network such as the Internet. If the "ping" command yields a positive result, then the requested host system is presently connected to the Internet, and the ISP Host Server merely updates the organized Database to reflect the request for services 144 and the remote user is connected to the host system 148. If the "ping" command indicates that the requested host system is not presently connected to the Internet, then the ISP Host Server makes a telephone call 146 to the requested host system using a modem 150.

If the requested host system includes a ring detection and triggering circuit (as discussed above in FIGS. 1A and 3A), the ring signal will be detected and the host system will be triggered to make a connection to the Internet. After the ISP Host Server dials the phone number of the requested host system, the "ping" function is executed again to verify that the host system has properly been triggered to connect to the network. If the "ping" indicates that the host system has connected, the Organized Database 122 is updated, and the remote user data packets are then routed to the host system 148. If the "ping" indicates that the host did not connect, then the ISP Host Server will repeat steps 142-146 until the host system makes a connection, or until some maximum number of redials is attempted.

Referring now to FIG. 5, an alternative method of connecting a host computer system to the Internet is disclosed where the remote user triggers the host system to connect to the Internet by first connecting to a third party intermediary server. According to this method, if the remote user cannot directly make a connection to the desired host system 172, because the host system is not presently connected to the Internet, the remote user can connect to a third party server 162, which could be, for example, a Web-server.

The third party server is configured to present the remote user with a list of host computer systems that may be remotely triggered to connect to the Internet. The remote user connects to the third party server at step 162, and selects the system he desires to communicate with at step 164. Stored at the third party server are the corresponding phone numbers and network addresses of the host systems that can be remotely triggered.

After the remote user selects a host system 164, the third party server executes a "ping" command to determine whether the selected host system is presently connected to the network. If the system is connected, the third party system immediately reports to the remote user at step 170 that the selected system is available. The remote user can then communicate directly with the host system. If the "ping" command indicates that the selected host system is not presently connected to the Internet, then at step 168 the third party server then calls the phone number associated with the selected host system. Assuming that the host system is equipped with the ring detection and triggering circuitry and software of the present invention, the phone call will cause the host system to execute a script that will create a connection to the Internet. If the host system is using the advanced ring detection circuit of the present invention (FIG. 3A), the third party system could also be supplied with the user validation signals and the trigger identification value to transmit in order to cause the proper connection to be established.

After the third party server dials the phone number of the selected host system it loops back to step 166 and executes the "ping" command in order to verify that the proper connection has been made. If the "ping" command is negative, the host system is dialed again. The looping between dialing and "ping"-ing continues until the host system makes a connection, or until some maximum number of redials is exceeded. After the "ping" command yields a positive result, the third party system reports to the remote user at step 170 that the selected host system is now connected to the Internet. The remote user can then directly communicate with the host system 172.

The invention has been described with reference to the preferred embodiments. Obviously, modifications and alterations will occur to others upon a reading and understanding of this specification. It is intended to include all such modifications and alterations insofar as they come within the scope of the appended claims or the equivalents thereof.

APPENDIX A: Page 1

```c
//------------------------------------------------------------
// Software Developed by: Softell
//
// Purpose: Act as the "Signal Monitor Process" for Windows 3.1.1
//
// Module: monitor.h
//
// Description:
//     This program opens a comm port and waits for CTS to change state.
//     When it sees a change, it waits for another change back. When this happens,
//     it compares the time agianst the time set in the jumpers, and then executes the
//     program specified on the command line.
//
#define WIN31          // this is a Windows 3.1 application
#define USECOMM        // yes, we need the COMM API
#define STRICT         // be bold!

#include <windows.h>
#include <commdlg.h>
include <string.h> include "version.h"
include "resource.h"

// constant definitions define GWW_NPTTYINFO       0
define ABOUTDLG_USEBITMAP  0 define ATOM_TTYINFO        0x100

// terminal size define MAXROWS        25
define MAXCOLS        80 define MAXBLOCK       80 define MAXLEN_TEMPSTR 81 define RXQUEUE        4096
define TXQUEUE        4096
```

APPENDIX A: Page 2

```
// cursor states define CS_HIDE      0x00
define CS_SHOW      0x01

// Flow control flags define FC_DTRDSR    0x01
define FC_RTSCTS    0x02
#define FC_XONXOFF   0x04

// ascii definitions define ASCII_BEL    0x07
define ASCII_BS     0x08
#define ASCII_LF     0x0A
#define ASCII_CR     0x0D
#define ASCII_XON    0x11
#define ASCII_XOFF   0x13

// data structures typedef struct tagTTYINFO
{
   int    idComDev ;
   BYTE   bPort, abScreen[ MAXROWS * MAXCOLS ] ;
   BOOL   fConnected, fXonXoff, fLocalEcho, fNewLine, fAutoWrap,
          fUseCNReceive, fDisplayErrors;
   BYTE   bByteSize, bFlowCtrl, bParity, bStopBits ;
   WORD   wBaudRate, wCursorState ;
   HFONT  hTTYFont ;
   LOGFONT lfTTYFont ;
   DWORD  rgbFGColor ;
   int    xSize, ySize, xScroll, yScroll, xOffset, yOffset,
          nColumn, nRow, xChar, yChar ;
   char   CommandLine[128];
}TTYINFO, NEAR *NPTTYINFO ;

// macros ( for easier readability )

#define GETHINST( hWnd )  ((HINSTANCE) GetWindowWord( hWnd,
GWW_HINSTANCE ))

#define COMDEV( x )  (x -> idComDev)
```

APPENDIX A: Page 3

```c
#define PORT( x )   (x -> bPort)
#define SCREEN( x ) (x -> abScreen)
#define CONNECTED( x ) (x -> fConnected)
#define XONXOFF( x ) (x -> fXonXoff)
#define LOCALECHO( x ) (x -> fLocalEcho)
#define NEWLINE( x ) (x -> fNewLine)
#define AUTOWRAP( x ) (x -> fAutoWrap)
#define BYTESIZE( x ) (x -> bByteSize)
#define FLOWCTRL( x ) (x -> bFlowCtrl)
#define PARITY( x ) (x -> bParity)
#define STOPBITS( x ) (x -> bStopBits)
#define BAUDRATE( x ) (x -> wBaudRate)
#define COMMANDLINE( x ) (x-> CommandLine)
#define CURSORSTATE( x ) (x -> wCursorState)
#define HTTYFONT( x ) (x -> hTTYFont)
#define LFTTYFONT( x ) (x -> lfTTYFont)
#define FGCOLOR( x ) (x -> rgbFGColor)
#define XSIZE( x ) (x -> xSize)
#define YSIZE( x ) (x -> ySize)
#define XSCROLL( x ) (x -> xScroll)
#define YSCROLL( x ) (x -> yScroll)
#define XOFFSET( x ) (x -> xOffset)
#define YOFFSET( x ) (x -> yOffset)
#define COLUMN( x ) (x -> nColumn)
#define ROW( x ) (x -> nRow)
#define XCHAR( x ) (x -> xChar)
#define YCHAR( x ) (x -> yChar )
#define USECNRECEIVE( x ) (x -> fUseCNReceive)
#define DISPLAYERRORS( x ) (x -> fDisplayErrors)

#define SET_PROP( x, y, z )  SetProp( x, MAKEINTATOM( y ), z )
#define GET_PROP( x, y )     GetProp( x, MAKEINTATOM( y ) )
#define REMOVE_PROP( x, y )  RemoveProp( x, MAKEINTATOM( y ) )

// global stuff char    gszTTYClass[] = "TTYWndClass" ;
char    gszAppName[] = "TTY" ;
HANDLE  ghAccel ;
WORD    gawBaudTable[] = {0, 1};

WORD    gawParityTable[] = {0, 1};

WORD    gawStopBitsTable[] = {0, 1};
```

APPENDIX A: Page 4

// function prototypes (private)

```
BOOL NEAR InitApplication( HANDLE ) ;
HWND NEAR InitInstance( HANDLE, int ) ;
LRESULT NEAR CreateTTYInfo( HWND ) ;
BOOL NEAR DestroyTTYInfo( HWND ) ;
BOOL NEAR ResetTTYScreen( HWND, NPTTYINFO ) ;
BOOL NEAR KillTTYFocus( HWND ) ;
BOOL NEAR PaintTTY( HWND ) ;
BOOL NEAR SetTTYFocus( HWND ) ;
BOOL NEAR ScrollTTYHorz( HWND, WORD, WORD ) ;
BOOL NEAR ScrollTTYVert( HWND, WORD, WORD ) ;
BOOL NEAR SizeTTY( HWND, WORD, WORD ) ;
BOOL NEAR ProcessTTYCharacter( HWND, BYTE ) ;
BOOL NEAR WriteTTYBlock( HWND, LPSTR, int ) ;
int NEAR ReadCommBlock( HWND, LPSTR, int ) ;
BOOL NEAR WriteCommByte( HWND, BYTE ) ;
BOOL NEAR MoveTTYCursor( HWND ) ;
BOOL NEAR OpenConnection( HWND ) ;
BOOL NEAR SetupConnection( HWND ) ;
BOOL NEAR CloseConnection( HWND ) ;
BOOL NEAR ProcessCOMMNotification( HWND, WORD, LONG ) ;
VOID NEAR GoModalDialogBoxParam( HINSTANCE, LPCSTR, HWND, DLGPROC,
LPARAM ) ;
VOID NEAR FillComboBox( HINSTANCE, HWND, int, WORD NEAR *, WORD, WORD )
;
BOOL NEAR SelectTTYFont( HWND ) ;
BOOL NEAR SettingsDlgInit( HWND ) ;
BOOL NEAR SettingsDlgTerm( HWND ) ;
```

// function prototypes (public)

```
LRESULT FAR PASCAL __export TTYWndProc( HWND, UINT, WPARAM, LPARAM ) ;
BOOL FAR PASCAL __export AboutDlgProc( HWND, UINT, WPARAM, LPARAM ) ;
BOOL FAR PASCAL __export SettingsDlgProc( HWND, UINT, WPARAM, LPARAM ) ;
```

```
//-----------------------------------------------------------------
//  End of File: tty.h
//-----------------------------------------------------------------

//-----------------------------------------------------------------
//
  Software Developed by:  Softell
//
```

APPENDIX A: Page 5

```
// Purpose: Act as the "Signal Monitor Process" for Windows 3.1.1
//
// Module: resource.h
//
// Description:
//     This program opens a comm port and waits for CTS to change state.
//     When it sees a change, it waits for another change back.  When this happens,
//     it compares the time agianst the time set in the jumpers, and then executes the
//     program specified on the command line.
//
//{{NO_DEPENDENCIES}}
// App Studio generated include file.
// Used by MONITOR.RC
//
#define IDD_OK              1
#define IDD_CANCEL          2
#define ABOUTDLGBOX         100
#define SETTINGSDLGBOX      101
#define TTYACCEL            200
#define IDM_CONNECT         0x100
#define IDM_DISCONNECT      0x101
#define IDM_EXIT            0x102
#define IDM_SETTINGS        0x103
#define IDM_ABOUT           0x104
#define TTYMENU             300
#define TTYICON             400
#define TTYBITMAP           500
#define IDD_ABOUTICON       0x210
#define IDD_TITLELINE       0x211
#define IDD_VERSION         0x212
#define IDD_BYLINE          0x213
#define IDD_WINDOWSMODE     0x214
#define IDD_FREEMEM         0x215
#define IDD_RESOURCES       0x216
#define IDD_PORTCB          0x220
#define IDD_BAUDCB          0x221
#define IDD_DATABITSCB      0x222
#define IDD_PARITYCB        0x223
#define IDD_STOPBITSCB      0x224
#define IDD_DTRDSR          0x225
#define IDD_RTSCTS          0x226
#define IDD_XONXOFF         0x227
#define IDD_AUTOWRAP        0x228
#define IDD_NEWLINE         0x229
```

APPENDIX A: Page 6

```
#define IDD_LOCALECHO          0x22A
#define IDD_FONT               0x22B
#define IDD_USECNRECEIVE       0x22C
#define IDD_DISPLAYERRORS      0x22D
#define IDS_BYLINE             0x300
#define IDS_MODE_STANDARD      0x301
#define IDS_MODE_ENHANCED      0x302
#define IDS_MODE_WLO           0x303
#define IDS_MODE_UNDEF         0x304
#define IDS_COMPREFIX          0x310
#define IDS_BAUD110            0x320
#define IDS_BAUD300            0x321
#define IDS_BAUD600            0x322
#define IDS_BAUD1200           0x323
#define IDS_BAUD2400           0x324
#define IDS_BAUD4800           0x325
#define IDS_BAUD9600           0x326
#define IDS_BAUD14400          0x327
#define IDS_BAUD19200          0x328
#define IDS_BAUD38400          0x329
#define IDS_BAUD56000          0x32A
#define IDS_BAUD128000         0x32B
#define IDS_BAUD256000         0x32C
#define IDS_PARITYNONE         0x330
#define IDS_PARITYEVEN         0x331
#define IDS_PARITYODD          0x332
#define IDS_PARITYMARK         0x333
#define IDS_PARITYSPACE        0x334
#define IDS_ONESTOPBIT         0x340
#define IDS_ONE5STOPBITS       0x341
#define IDS_TWOSTOPBITS        0x342
#define IDC_COMMANDLINEEDIT    1000
#define IDC_STATIC             -1

// Next default values for new objects
//
#ifdef APSTUDIO_INVOKED
ifndef APSTUDIO_READONLY_SYMBOLS define _APS_NEXT_RESOURCE_VALUE    105
define _APS_NEXT_COMMAND_VALUE     101
#define _APS_NEXT_CONTROL_VALUE     1001
#define _APS_NEXT_SYMED_VALUE       101
#endif
```

APPENDIX A: Page 7

```c
#endif
//----------------------------------------------------------------
//
//  Software Developed by:  Softell
//
//  Purpose: Act as the "Signal Monitor Process" for Windows 3.1.1
//
//  Module: version.h
//
//  Description:
//     This program opens a comm port and waits for CTS to change state.
//     When it sees a change, it waits for another change back.  When this happens,
//     it compares the time agianst the time set in the jumpers, and then executes the
//     program specified on the command line.
//
#define VER_MAJOR 1
#define VER_MINOR 0
#define VER_BUILD 0
//----------------------------------------------------------------
//
//  Software Developed by:  Softell
//
//  Purpose: Act as the "Signal Monitor Process" for Windows 3.1.1
//
//  Module: monitor.c
//
//  Description:
//     This program opens a comm port and waits for CTS to change state.
//     When it sees a change, it waits for another change back.  When this happens,
//     it compares the time agianst the time set in the jumpers, and then executes the
//     program specified on the command line.
//
#include "monitor.h"
#include <stdio.h>
include <time.h> short call_started = 0;
short wait_time[4] = {5,10,20,40};
short wait_time_index = 0;
int Read_File(HWND hWnd);
time_t event_time;
FILE *f_in;
```

APPENDIX A: Page 8

```
//----------------------------------------------------------------
// int PASCAL WinMain( HANDLE hInstance, HANDLE hPrevInstance,
//               LPSTR lpszCmdLine, int nCmdShow )
//
// Description:
//    This is the main window loop!
//
// Parameters:
//    As documented for all WinMain() functions.
//
//---------------------------------------------------------------- int PASCAL WinMain( HINSTANCE hInstance, HINSTANCE hPrevInstance,
            LPSTR lpszCmdLine, int nCmdShow )
{
  HWND  hTTYWnd ;
  MSG   msg ;

if (!hPrevInstance)
     if (!InitApplication( hInstance ))
        return ( FALSE ) ;

if (NULL == (hTTYWnd = InitInstance( hInstance, nCmdShow )))
     return ( FALSE ) ;

while (GetMessage( &msg, NULL, 0, 0 ))
  {
     if (!TranslateAccelerator( hTTYWnd, ghAccel, &msg ))
     {
        TranslateMessage( &msg ) ;
        DispatchMessage( &msg ) ;
     }
  }
  return ( (int) msg.wParam ) ;

}// end of WinMain()

//----------------------------------------------------------------
// BOOL NEAR InitApplication( HANDLE hInstance )
//
// Description:
//    First time initialization stuff.  This registers information
//    such as window classes.
//
```

APPENDIX A: Page 9

```
// Parameters:
//     HANDLE hInstance
//         Handle to this instance of the application.
//
//-----------------------------------------------------------------------

BOOL NEAR InitApplication( HANDLE hInstance )
{
    WNDCLASS wndclass ;

// register tty window class wndclass.style         = NULL ;
    wndclass.lpfnWndProc   = TTYWndProc ;
    wndclass.cbClsExtra    = 0 ;
    wndclass.cbWndExtra    = sizeof( WORD ) ;
    wndclass.hInstance     = hInstance ;
    wndclass.hIcon         = LoadIcon( hInstance, MAKEINTRESOURCE( TTYICON ) );
    wndclass.hCursor       = LoadCursor( NULL, IDC_ARROW ) ;
    wndclass.hbrBackground = (HBRUSH) (COLOR_WINDOW + 1) ;
    wndclass.lpszMenuName  = MAKEINTRESOURCE( TTYMENU ) ;
    wndclass.lpszClassName = gszTTYClass ;

return( RegisterClass( &wndclass ) ) ;

}// end of InitApplication()

//-----------------------------------------------------------------------
// HWND NEAR InitInstance( HANDLE hInstance, int nCmdShow )
//
// Description:
//     Initializes instance specific information.
//
// Parameters:
//     HANDLE hInstance
//         Handle to instance
//
//     int nCmdShow
//         How do we show the window?
//
//-----------------------------------------------------------------------

HWND NEAR InitInstance( HANDLE hInstance, int nCmdShow )
{
```

APPENDIX A: Page 10

```
  HWND hTTYWnd ;

// load accelerators
  ghAccel = LoadAccelerators( hInstance, MAKEINTRESOURCE( TTYACCEL ) ) ;

// create the TTY window
  hTTYWnd = CreateWindow( gszTTYClass, gszAppName,
              WS_OVERLAPPEDWINDOW,
              CW_USEDEFAULT, CW_USEDEFAULT,
              CW_USEDEFAULT, CW_USEDEFAULT,
              NULL, NULL, hInstance, NULL ) ;

if (NULL == hTTYWnd)
     return ( NULL ) ;

ShowWindow( hTTYWnd, nCmdShow ) ;
  UpdateWindow( hTTYWnd ) ;

return ( hTTYWnd ) ;

}// end of InitInstance()

//-----------------------------------------------------------------
// LRESULT FAR PASCAL __export TTYWndProc( HWND hWnd, UINT uMsg,
//                      WPARAM wParam, LPARAM lParam )
//
// Description:
//    This is the TTY Window Proc.  This handles ALL messages
//    to the tty window.
//
// Parameters:
//    As documented for Window procedures.
//
//-----------------------------------------------------------------

LRESULT FAR PASCAL __export TTYWndProc( HWND hWnd, UINT uMsg,
                      WPARAM wParam, LPARAM lParam )
{
  switch (uMsg)
  {
    case WM_CREATE:
    { CreateTTYInfo( hWnd ) ;
      Read_File(hWnd);
```

APPENDIX A: Page 11

```
//  SetupConnection( hWnd );
    if (!OpenConnection( hWnd ))
        MessageBox( hWnd, "Connection failed.", gszAppName,
                MB_ICONEXCLAMATION ) ;

}
break;

case WM_COMMAND:
{
  switch ((WORD) wParam)
  {
    case IDM_CONNECT:
    {
    CloseConnection(hWnd);
    if (!OpenConnection( hWnd ))
        MessageBox( hWnd, "Connection failed.", gszAppName,
                MB_ICONEXCLAMATION ) ;
    }
      break ;

case IDM_SETTINGS:
    {
      NPTTYINFO  npTTYInfo ;

if (NULL == (npTTYInfo =
                (NPTTYINFO) GetWindowWord( hWnd,
                                GWW_NPTTYINFO )))
        return ( FALSE ) ;
      GoModalDialogBoxParam( GETHINST( hWnd ),
                MAKEINTRESOURCE( SETTINGSDLGBOX ), hWnd,
                SettingsDlgProc,
                (LPARAM) (LPSTR) npTTYInfo ) ;

// if fConnected, set new COM parameters if (CONNECTED( npTTYInfo ))
      {
        if (!SetupConnection( hWnd ))
          MessageBox( hWnd, "Settings failed!", gszAppName,
                MB_ICONEXCLAMATION ) ;
      }
    }
    break ;
```

APPENDIX A: Page 12
```
      case IDM_ABOUT:
        GoModalDialogBoxParam ( GETHINST( hWnd ),
                      MAKEINTRESOURCE( ABOUTDLGBOX ),
                      hWnd,
                      AboutDlgProc, NULL ) ;
      break;

case IDM_EXIT:

PostMessage( hWnd, WM_CLOSE, NULL, 0L ) ;
        break ;
    }
  }
  break ;

case WM_COMMNOTIFY:
#ifdef DEBUG
    f_in =fopen("debug.txt","a");
    time(&event_time);
    fprintf(f_in, "%ld\r\n",event_time);
    fclose(f_in);
#endif
    ProcessCOMMNotification( hWnd, (WORD) wParam, (LONG) lParam );
    break ;

case WM_PAINT:
    PaintTTY( hWnd ) ;
    break ;

case WM_SIZE:
    SizeTTY( hWnd, HIWORD( lParam ), LOWORD( lParam ) ) ;
    break ;

case WM_HSCROLL:
    ScrollTTYHorz( hWnd, (WORD) wParam, LOWORD( lParam ) ) ;
    break ;

case WM_VSCROLL:
    ScrollTTYVert( hWnd, (WORD) wParam, LOWORD( lParam ) ) ;
    break ;

case WM_CHAR:
    ProcessTTYCharacter( hWnd, LOBYTE( wParam ) ) ;
    break ;
```

APPENDIX A: Page 13

```
   case WM_SETFOCUS:
     SetTTYFocus( hWnd ) ;
     break ;

case WM_KILLFOCUS:
     KillTTYFocus( hWnd ) ;
     break ;

case WM_DESTROY:
     DestroyTTYInfo( hWnd ) ;
     PostQuitMessage( 0 ) ;
     break ;

case WM_CLOSE:
     if (IDOK != MessageBox( hWnd, "OK to close window?", "TTY Sample",
                  MB_ICONQUESTION | MB_OKCANCEL ))
       break ;

// fall through default:
     return( DefWindowProc( hWnd, uMsg, wParam, lParam ) ) ;
   }
   return 0L ;

}// end of TTYWndProc()

//----------------------------------------------------------------
//  LRESULT NEAR CreateTTYInfo( HWND hWnd )
//
//  Description:
//     Creates the tty information structure and sets
//     menu option availability.  Returns -1 if unsuccessful.
//
//  Parameters:
//     HWND   hWnd
//        Handle to main window.
//
//----------------------------------------------------------------

LRESULT NEAR CreateTTYInfo( HWND hWnd )
{
   HMENU      hMenu ;
   NPTTYINFO  npTTYInfo ;
```

APPENDIX A: Page 14

```
if (NULL = = (npTTYInfo =
            (NPTTYINFO) LocalAlloc( LPTR, sizeof( TTYINFO ) )))
    return ( (LRESULT) -1 ) ;

// initialize TTY info structure

COMDEV( npTTYInfo )     = 0 ;
CONNECTED( npTTYInfo )  = FALSE ;
CURSORSTATE( npTTYInfo ) = CS_HIDE ;
LOCALECHO( npTTYInfo )  = FALSE ;
AUTOWRAP( npTTYInfo )   = TRUE ;
PORT( npTTYInfo )       = 1 ;
BAUDRATE( npTTYInfo )   = CBR_9600 ;
BYTESIZE( npTTYInfo )   = 8 ;
FLOWCTRL( npTTYInfo )   = FC_RTSCTS ;
PARITY( npTTYInfo )     = NOPARITY ;
STOPBITS( npTTYInfo )   = ONESTOPBIT ;
XONXOFF( npTTYInfo )    = FALSE ;
XSIZE( npTTYInfo )      = 0 ;
YSIZE( npTTYInfo )      = 0 ;
XSCROLL( npTTYInfo )    = 0 ;
YSCROLL( npTTYInfo )    = 0 ;
XOFFSET( npTTYInfo )    = 0 ;
YOFFSET( npTTYInfo )    = 0 ;
COLUMN( npTTYInfo )     = 0 ;
ROW( npTTYInfo )        = 0 ;
HTTYFONT( npTTYInfo )   = NULL ;
FGCOLOR( npTTYInfo )    = RGB( 0, 0, 0 ) ;
USECNRECEIVE( npTTYInfo ) = TRUE ;
DISPLAYERRORS( npTTYInfo ) = TRUE ;

// clear screen space

_fmemset( SCREEN( npTTYInfo ), ' ', MAXROWS * MAXCOLS ) ;

// setup default font information

LFTTYFONT( npTTYInfo ).lfHeight =      12 ;
LFTTYFONT( npTTYInfo ).lfWidth =        0 ;
LFTTYFONT( npTTYInfo ).lfEscapement =   0 ;
LFTTYFONT( npTTYInfo ).lfOrientation =  0 ;
LFTTYFONT( npTTYInfo ).lfWeight =       0 ;
LFTTYFONT( npTTYInfo ).lfItalic =       0 ;
LFTTYFONT( npTTYInfo ).lfUnderline =    0 ;
```

APPENDIX A: Page 15

```
LFTTYFONT( npTTYInfo ).lfStrikeOut      =    0 ;
LFTTYFONT( npTTYInfo ).lfCharSet        =    OEM_CHARSET ;
LFTTYFONT( npTTYInfo ).lfOutPrecision   =    OUT_DEFAULT_PRECIS ;
LFTTYFONT( npTTYInfo ).lfClipPrecision  =    CLIP_DEFAULT_PRECIS ;
LFTTYFONT( npTTYInfo ).lfQuality        =    DEFAULT_QUALITY ;
LFTTYFONT( npTTYInfo ).lfPitchAndFamily =    FIXED_PITCH | FF_MODERN ;
LFTTYFONT( npTTYInfo ).lfFaceName[0]    =    NULL ;

// set TTYInfo handle before any further message processing.

SetWindowWord( hWnd, GWW_NPTTYINFO, (WPARAM) npTTYInfo ) ;

// reset the character information, etc.

ResetTTYScreen( hWnd, npTTYInfo ) ;

hMenu = GetMenu( hWnd ) ;
EnableMenuItem( hMenu, IDM_DISCONNECT,
           MF_GRAYED | MF_DISABLED | MF_BYCOMMAND ) ;
EnableMenuItem( hMenu, IDM_CONNECT, MF_ENABLED | MF_BYCOMMAND ) ;

return ( (LRESULT) TRUE ) ;

}// end of CreateTTYInfo()

//-----------------------------------------------------------------------
//   BOOL NEAR DestroyTTYInfo( HWND hWnd )
//
//   Description:
//       Destroys block associated with TTY window handle.
//
//   Parameters:
//       HWND hWnd
//           handle to TTY window
//
//-----------------------------------------------------------------------

BOOL NEAR DestroyTTYInfo( HWND hWnd )
{
  NPTTYINFO npTTYInfo ;

if (NULL == (npTTYInfo = (NPTTYINFO) GetWindowWord( hWnd,
GWW_NPTTYINFO )))
       return ( FALSE ) ;
```

APPENDIX A: Page 16

```
// force connection closed (if not already closed)

if (CONNECTED( npTTYInfo ))
   CloseConnection( hWnd ) ;

DeleteObject( HTTYFONT( npTTYInfo ) ) ;

LocalFree( npTTYInfo ) ;
return ( TRUE ) ;

}// end of DestroyTTYInfo()

//-----------------------------------------------------------------------
// BOOL NEAR ResetTTYScreen( HWND hWnd, NPTTYINFO npTTYInfo )
//
// Description:
//    Resets the TTY character information and causes the
//    screen to resize to update the scroll information.
//
// Parameters:
//    NPTTYINFO  npTTYInfo
//       pointer to TTY info structure
//
//-----------------------------------------------------------------------
BOOL NEAR ResetTTYScreen( HWND hWnd, NPTTYINFO npTTYInfo )
{
   HDC        hDC ;
   TEXTMETRIC tm ;
   RECT       rcWindow ;

if (NULL == npTTYInfo)
      return ( FALSE ) ;

if (NULL != HTTYFONT( npTTYInfo ))
      DeleteObject( HTTYFONT( npTTYInfo ) ) ;

HTTYFONT( npTTYInfo ) = CreateFontIndirect( &LFTTYFONT( npTTYInfo ) ) ;

hDC = GetDC( hWnd ) ;
   SelectObject( hDC, HTTYFONT( npTTYInfo ) ) ;
   GetTextMetrics( hDC, &tm ) ;
   ReleaseDC( hWnd, hDC ) ;
```

APPENDIX A: Page 17

```
XCHAR( npTTYInfo ) = tm.tmAveCharWidth ;
YCHAR( npTTYInfo ) = tm.tmHeight + tm.tmExternalLeading ;

// a slimy hack to force the scroll position, region to
// be recalculated based on the new character sizes GetWindowRect( hWnd, &rcWindow ) ;
SendMessage( hWnd, WM_SIZE, SIZENORMAL,
        (LPARAM) MAKELONG( rcWindow.right - rcWindow.left,
                    rcWindow.bottom - rcWindow.top ) ) ;

return ( TRUE ) ;

}// end of ResetTTYScreen()

//---------------------------------------------------------------------
// BOOL NEAR ProcessCOMMNotification( HWND hWnd, WORD wParam, LONG
lParam )
//
// Description:
//    Processes the WM_COMMNOTIFY message from the COMM.DRV.
//
// Parameters:
//    HWND hWnd
//       handle to TTY window
//
//    WORD wParam
//       specifes the device (nCid)
//
//    LONG lParam
//       LOWORD contains event trigger
//       HIWORD is NULL
//
//---------------------------------------------------------------------
BOOL NEAR ProcessCOMMNotification( HWND hWnd, WORD wParam, LONG lParam
)
{
  NPTTYINFO  npTTYInfo ;
  UINT       e_comm, ret;
  time_t     elapsed_time, start_time, end_time;
```

APPENDIX A: Page 18

```
   if (NULL = = (npTTYInfo = (NPTTYINFO) GetWindowWord( hWnd,
GWW_NPTTYINFO )))
      return ( FALSE ) ;

// verify that it is a COMM event specified by our mask if (CN_EVENT & LOWORD( lParam ) != CN_EVENT)
      return ( FALSE ) ;

wait_time_index = BAUDRATE(npTTYInfo)*2 + BYTESIZE(npTTYInfo);

if (call_started = = 0)
      {
      time(&start_time);
      call_started = 1;
      }
   else
      {
      time(&end_time);
      elapsed_time = end_time - start_time;
      if(( elapsed_time > wait_time[wait_time_index]*.75 )
         &&( elapsed_time < wait_time[wait_time_index]*1.25 ))
         {
            // run application
            ret = WinExec(npTTYInfo->CommandLine, SW_SHOW);
         }
      }

// reset the event word so we are notified
   // when the next event occurs
   e_comm = GetCommEventMask( COMDEV( npTTYInfo ), EV_CTS ) ;

return ( TRUE ) ;

}// end of ProcessCOMMNotification()

//--------------------------------------------------------------------
// BOOL NEAR ProcessTTYCharacter( HWND hWnd, BYTE bOut )
//
// Description:
//    This simply writes a character to the port and echos it
//    to the TTY screen if fLocalEcho is set.  Some minor
//    keyboard mapping could be performed here.
```

APPENDIX A: Page 19

```
//
// Parameters:
//    HWND hWnd
//       handle to TTY window
//
//    BYTE bOut
//       byte from keyboard
//
//-----------------------------------------------------------------

BOOL NEAR ProcessTTYCharacter( HWND hWnd, BYTE bOut )
{
  NPTTYINFO npTTYInfo ;

if (NULL = = (npTTYInfo = (NPTTYINFO) GetWindowWord( hWnd,
GWW_NPTTYINFO )))
     return ( FALSE ) ;

if (!CONNECTED( npTTYInfo ))
     return ( FALSE ) ;

WriteCommByte( hWnd, bOut ) ;
  if (LOCALECHO( npTTYInfo ))
     WriteTTYBlock( hWnd, &bOut, 1 ) ;

return ( TRUE ) ;

}// end of ProcessTTYCharacter()

//-----------------------------------------------------------------
// BOOL NEAR OpenConnection( HWND hWnd )
//
// Description:
//    Opens communication port specified in the TTYINFO struct.
//    It also sets the CommState and notifies the window via
//    the fConnected flag in the TTYINFO struct.
//
// Parameters:
//    HWND hWnd
//       handle to TTY window
//
//-----------------------------------------------------------------

BOOL NEAR OpenConnection( HWND hWnd )
```

APPENDIX A: Page 20

```
{
    char    szPort[ 10 ], szTemp[ 10 ] ;
    BOOL    fRetVal ;
    HCURSOR hOldCursor, hWaitCursor ;
    HMENU   hMenu ;
    NPTTYINFO npTTYInfo ;
    UINT ret;

if (NULL = = (npTTYInfo = (NPTTYINFO) GetWindowWord( hWnd,
GWW_NPTTYINFO )))
        return ( FALSE ) ;

// show the hourglass cursor
    hWaitCursor = LoadCursor( NULL, IDC_WAIT ) ;
    hOldCursor = SetCursor( hWaitCursor ) ;

// load the COM prefix string and append port number

LoadString( GETHINST( hWnd ), IDS_COMPREFIX, szTemp, sizeof( szTemp ) ) ;
    wsprintf( szPort, "%s%d", (LPSTR) szTemp, PORT( npTTYInfo ) ) ;

// open COMM device if ((COMDEV( npTTYInfo ) = OpenComm( szPort, RXQUEUE, TXQUEUE )) < 0)
        return ( FALSE ) ;

fRetVal = SetupConnection( hWnd ) ;

if (fRetVal)
    {
        CONNECTED( npTTYInfo ) = TRUE ;

// set up notifications from COMM.DRV

// In this case we really are only using the notifications
        // for the received characters - it could be expanded to
        // cover the changes in CD or other status lines.

SetCommEventMask( COMDEV( npTTYInfo ), EV_CTS ) ;

// Enable notifications for events only.

// NB: This method does not use the specific
        // in/out queue triggers.
```

APPENDIX A: Page 21

```
    EnableCommNotification( COMDEV( npTTYInfo ), hWnd, -1, -1 ) ;

// assert DTR

EscapeCommFunction( COMDEV( npTTYInfo ), SETDTR ) ;

SetTTYFocus( hWnd ) ;

hMenu = GetMenu( hWnd ) ;
    EnableMenuItem( hMenu, IDM_DISCONNECT,
              MF_ENABLED | MF_BYCOMMAND ) ;
    EnableMenuItem( hMenu, IDM_CONNECT,
              MF_GRAYED | MF_DISABLED | MF_BYCOMMAND ) ;
  }
  else
  {
    CONNECTED( npTTYInfo ) = FALSE ;
    CloseComm( COMDEV( npTTYInfo ) ) ;
  }

// restore cursor
  SetCursor( hOldCursor ) ;

return ( fRetVal ) ;

}// end of OpenConnection()

//---------------------------------------------------------------
//  BOOL NEAR SetupConnection( HWND hWnd )
//
//  Description:
//     This routines sets up the DCB based on settings in the
//     TTY info structure and performs a SetCommState().
//
//  Parameters:
//     HWND hWnd
//        handle to TTY window
//
//---------------------------------------------------------------

BOOL NEAR SetupConnection( HWND hWnd )
{
  BOOL     fRetVal ;
```

APPENDIX A: Page 22

```c
BYTE    bSet ;
DCB     dcb ;
NPTTYINFO npTTYInfo ;

if (NULL == (npTTYInfo = (NPTTYINFO) GetWindowWord( hWnd,
GWW_NPTTYINFO )))
    return ( FALSE ) ;

GetCommState( COMDEV( npTTYInfo ), &dcb ) ;

dcb.BaudRate = CBR_9600 ;
dcb.ByteSize = 8;
dcb.Parity = NOPARITY;
dcb.StopBits = ONESTOPBIT ;

// setup hardware flow control

//bSet = (BYTE) ((FLOWCTRL( npTTYInfo ) & FC_DTRDSR) != 0) ;
dcb.fOutxDsrFlow = dcb.fDtrflow = 0 ;
dcb.DsrTimeout = 0;

//bSet = (BYTE) ((FLOWCTRL( npTTYInfo ) & FC_RTSCTS) != 0) ;
dcb.fOutxCtsFlow = dcb.fRtsflow = 0 ;
dcb.CtsTimeout = 0 ;

// setup software flow control

//bSet = (BYTE) ((FLOWCTRL( npTTYInfo ) & FC_XONXOFF) != 0) ;

dcb.fInX = dcb.fOutX = 0 ;
dcb.XonChar = ASCII_XON ;
dcb.XoffChar = ASCII_XOFF ;
dcb.XonLim = 100 ;
dcb.XoffLim = 100 ;

// other various settings dcb.fBinary = TRUE ;
dcb.fParity = TRUE ;
dcb.fRtsDisable = FALSE ;
dcb.fDtrDisable = FALSE ;

fRetVal = !(SetCommState( &dcb ) < 0) ;
```

APPENDIX A: Page 23

```
    return ( fRetVal ) ;

}// end of SetupConnection()

//----------------------------------------------------------------
//  BOOL NEAR CloseConnection( HWND hWnd )
//
//  Description:
//      Closes the connection to the port.  Resets the connect flag
//      in the TTYINFO struct.
//
//  Parameters:
//      HWND hWnd
//          handle to TTY window
//
//----------------------------------------------------------------

BOOL NEAR CloseConnection( HWND hWnd )
{
    HMENU     hMenu ;
    NPTTYINFO npTTYInfo ;

if (NULL = = (npTTYInfo = (NPTTYINFO) GetWindowWord( hWnd,
GWW_NPTTYINFO )))
        return ( FALSE ) ;

// Disable event notification.  Using a NULL hWnd tells
    // the COMM.DRV to disable future notifications.

EnableCommNotification( COMDEV( npTTYInfo ), NULL, -1, -1 ) ;

// kill the focus

KillTTYFocus( hWnd ) ;

// drop DTR

EscapeCommFunction( COMDEV( npTTYInfo ), CLRDTR ) ;

// close comm connection

CloseComm( COMDEV( npTTYInfo ) ) ;
    CONNECTED( npTTYInfo ) = FALSE ;
```

APPENDIX A: Page 24

// change the selectable items in the menu

```
hMenu = GetMenu( hWnd ) ;
EnableMenuItem( hMenu, IDM_DISCONNECT,
         MF_GRAYED | MF_DISABLED | MF_BYCOMMAND ) ;
EnableMenuItem( hMenu, IDM_CONNECT,
         MF_ENABLED | MF_BYCOMMAND ) ;

return ( TRUE ) ;

}// end of CloseConnection()

//----------------------------------------------------------------
// int NEAR ReadCommBlock( HWND hWnd, LPSTR lpszBlock, int nMaxLength )
//
// Description:
//    Reads a block from the COM port and stuffs it into
//    the provided block.
//
// Parameters:
//    HWND hWnd
//       handle to TTY window
//
//    LPSTR lpszBlock
//       block used for storage
//
//    int nMaxLength
//       max length of block to read
//
//---------------------------------------------------------------- int NEAR ReadCommBlock( HWND hWnd, LPSTR lpszBlock, int nMaxLength )
{
   char     szError[ 10 ] ;
   int      nLength, nError ;
   NPTTYINFO  npTTYInfo ;

if (NULL == (npTTYInfo = (NPTTYINFO) GetWindowWord( hWnd,
GWW_NPTTYINFO )))
       return ( FALSE ) ;

nLength = ReadComm( COMDEV( npTTYInfo ), lpszBlock, nMaxLength ) ;

if (nLength < 0)
```

APPENDIX A: Page 25

```
    {
      nLength *= -1 ;
      while (nError = GetCommError( COMDEV( npTTYInfo ), NULL ))
      {
        if (DISPLAYERRORS( npTTYInfo ))
        {
          wsprintf( szError, "<CE-%d>", nError ) ;
          WriteTTYBlock( hWnd, szError, lstrlen( szError ) ) ;
        }
      }
    } return ( nLength ) ;

}// end of ReadCommBlock()

//----------------------------------------------------------------------
// BOOL NEAR WriteCommByte( HWND hWnd, BYTE bByte )
//
// Description:
//     Writes a byte to the COM port specified in the associated
//     TTY info structure.
//
// Parameters:
//     HWND hWnd
//        handle to TTY window
//
//     BYTE bByte
//        byte to write to port
//
//----------------------------------------------------------------------
BOOL NEAR WriteCommByte( HWND hWnd, BYTE bByte )
{
  NPTTYINFO  npTTYInfo ;

if (NULL == (npTTYInfo = (NPTTYINFO) GetWindowWord( hWnd,
GWW_NPTTYINFO )))
     return ( FALSE ) ;

WriteComm( COMDEV( npTTYInfo ), (LPSTR) &bByte, 1 ) ;

return ( TRUE ) ;
```

APPENDIX A: Page 26

```c
}// end of WriteCommByte()

//-----------------------------------------------------------------
// BOOL NEAR WriteTTYBlock( HWND hWnd, LPSTR lpBlock, int nLength )
//
// Description:
//     Writes block to TTY screen.  Nothing fancy - just
//     straight TTY.
//
// Parameters:
//     HWND hWnd
//        handle to TTY window
//
//     LPSTR lpBlock
//        far pointer to block of data
//
//     int nLength
//        length of block
//
//-----------------------------------------------------------------
BOOL NEAR WriteTTYBlock( HWND hWnd, LPSTR lpBlock, int nLength )
{
   int        i ;
   NPTTYINFO  npTTYInfo ;
   RECT       rect ;

if (NULL == (npTTYInfo = (NPTTYINFO) GetWindowWord( hWnd,
GWW_NPTTYINFO )))
       return ( FALSE ) ;

for (i = 0 ; i < nLength; i++)
   {
     switch (lpBlock[ i ])
     {
       case ASCII_BEL:
         // Bell
         MessageBeep( 0 ) ;
         break ;

case ASCII_BS:
         // Backspace
         if (COLUMN( npTTYInfo ) > 0)
            COLUMN( npTTYInfo ) -- ;
```

APPENDIX A: Page 27

```
      MoveTTYCursor( hWnd ) ;
      break ;

case ASCII_CR:
      // Carriage return
      COLUMN( npTTYInfo ) = 0 ;
      MoveTTYCursor( hWnd ) ;
      if (!NEWLINE( npTTYInfo ))
        break;

// fall through case ASCII_LF:
      // Line feed
      if (ROW( npTTYInfo )++ == MAXROWS - 1)
      {
        _fmemmove( (LPSTR) (SCREEN( npTTYInfo )),
              (LPSTR) (SCREEN( npTTYInfo ) + MAXCOLS),
              (MAXROWS - 1) * MAXCOLS ) ;
        _fmemset( (LPSTR) (SCREEN( npTTYInfo ) + (MAXROWS - 1) *
MAXCOLS),
              ' ', MAXCOLS ) ;
        InvalidateRect( hWnd, NULL, FALSE ) ;
        ROW( npTTYInfo )-- ;
      }
      MoveTTYCursor( hWnd ) ;
      break ;

default:
      *(SCREEN( npTTYInfo ) + ROW( npTTYInfo ) * MAXCOLS +
        COLUMN( npTTYInfo )) = lpBlock[ i ] ;
      rect.left = (COLUMN( npTTYInfo ) * XCHAR( npTTYInfo )) -
            XOFFSET( npTTYInfo ) ;
      rect.right = rect.left + XCHAR( npTTYInfo ) ;
      rect.top = (ROW( npTTYInfo ) * YCHAR( npTTYInfo )) -
            YOFFSET( npTTYInfo ) ;
      rect.bottom = rect.top + YCHAR( npTTYInfo ) ;
      InvalidateRect( hWnd, &rect, FALSE ) ;

// Line wrap
      if (COLUMN( npTTYInfo ) < MAXCOLS - 1)
        COLUMN( npTTYInfo )++ ;
      else if (AUTOWRAP( npTTYInfo ))
        WriteTTYBlock( hWnd, "\r\n", 2 ) ;
```

APPENDIX A: Page 28

```
        break;
    }
  }
  return ( TRUE ) ;

}// end of WriteTTYBlock()

//-----------------------------------------------------------------
// VOID NEAR GoModalDialogBoxParam( HINSTANCE hInstance,
//                       LPCSTR lpszTemplate, HWND hWnd,
//                       DLGPROC lpDlgProc, LPARAM lParam )
//
// Description:
//    It is a simple utility function that simply performs the
//    MPI and invokes the dialog box with a DWORD paramter.
//
// Parameters:
//    similar to that of DialogBoxParam() with the exception
//    that the lpDlgProc is not a procedure instance
//
//-----------------------------------------------------------------

VOID NEAR GoModalDialogBoxParam( HINSTANCE hInstance, LPCSTR lpszTemplate,
                  HWND hWnd, DLGPROC lpDlgProc, LPARAM lParam )
{
  DLGPROC  lpProcInstance ;

lpProcInstance = (DLGPROC) MakeProcInstance( (FARPROC) lpDlgProc,
                                  hInstance ) ;
  DialogBoxParam( hInstance, lpszTemplate, hWnd, lpProcInstance, lParam ) ;
  FreeProcInstance( (FARPROC) lpProcInstance ) ;

}// end of GoModalDialogBoxParam()

//-----------------------------------------------------------------
// BOOL FAR PASCAL __export AboutDlgProc( HWND hDlg, UINT uMsg,
//                       WPARAM wParam, LPARAM lParam )
//
// Description:
//    Simulates the Windows System Dialog Box.
//
// Parameters:
//    Same as standard dialog procedures.
//
```

APPENDIX A: Page 29

//----------------------------------------------------------------------

```c
BOOL FAR PASCAL __export AboutDlgProc( HWND hDlg, UINT uMsg,
                    WPARAM wParam, LPARAM lParam )
{
  switch (uMsg)
  {
    case WM_INITDIALOG:
    {
        int       idModeString ;
        char      szBuffer[ MAXLEN_TEMPSTR ], szTemp[ MAXLEN_TEMPSTR ] ;
        DWORD     dwFreeMemory, dwWinFlags ;
        WORD      wFreeResources, wRevision, wVersion ;

#ifdef ABOUTDLG_USEBITMAP
        // if we are using the bitmap, hide the icon

ShowWindow( GetDlgItem( hDlg, IDD_ABOUTICON ), SW_HIDE ) ;
#endif
        // sets up the version number for Windows wVersion = LOWORD( GetVersion() ) ;
        switch (HIBYTE( wVersion ))
        {
          case 10:
            wRevision = 1 ;
            break ;

default:
            wRevision = 0 ;
            break;
        }
        wVersion &= 0xFF ;

GetDlgItemText( hDlg, IDD_TITLELINE, szTemp, sizeof( szTemp ) ) ;
        wsprintf( szBuffer, szTemp, wVersion, wRevision ) ;
        SetDlgItemText( hDlg, IDD_TITLELINE, szBuffer ) ;

// sets up version number for TTY

GetDlgItemText( hDlg, IDD_VERSION, szTemp, sizeof( szTemp ) ) ;
        wsprintf( szBuffer, szTemp, VER_MAJOR, VER_MINOR ) ;
        SetDlgItemText( hDlg, IDD_VERSION, (LPSTR) szBuffer ) ;
```

APPENDIX A: Page 30

```
    // get by-line

LoadString( GETHINST( hDlg ), IDS_BYLINE, szBuffer,
            sizeof( szBuffer ) ) ;
    SetDlgItemText( hDlg, IDD_BYLINE, szBuffer ) ;

// set windows mode information dwWinFlags = GetWinFlags() ;
    if (dwWinFlags & WF_ENHANCED)
        idModeString = IDS_MODE_ENHANCED ;
    else if (dwWinFlags & WF_STANDARD)
        idModeString = IDS_MODE_STANDARD ;
    else if (dwWinFlags & WF_WLO)
        idModeString = IDS_MODE_WLO ;
    else
        idModeString = IDS_MODE_UNDEF ;

LoadString( GETHINST( hDlg ), idModeString, szBuffer,
            sizeof( szBuffer ) ) ;
    SetDlgItemText( hDlg, IDD_WINDOWSMODE, szBuffer ) ;

// get free memory information dwFreeMemory = GetFreeSpace( 0 ) / 1024L ;
    GetDlgItemText( hDlg, IDD_FREEMEM, szTemp, sizeof( szTemp ) ) ;
    wsprintf( szBuffer, szTemp, dwFreeMemory ) ;
    SetDlgItemText( hDlg, IDD_FREEMEM, (LPSTR) szBuffer ) ;

// get free resources information wFreeResources = GetFreeSystemResources( 0 ) ;
    GetDlgItemText( hDlg, IDD_RESOURCES, szTemp, sizeof( szTemp ) ) ;
    wsprintf( szBuffer, szTemp, wFreeResources ) ;
    SetDlgItemText( hDlg, IDD_RESOURCES, (LPSTR) szBuffer ) ;
  }
  return ( TRUE ) ;

#ifdef ABOUTDLG_USEBITMAP
    // used to paint the bitmap case WM_PAINT:
    {
       HBITMAP     hBitMap ;
```

APPENDIX A: Page 31

```
      HDC      hDC, hMemDC ;
      PAINTSTRUCT ps ;

// load bitmap and display it hDC = BeginPaint( hDlg, &ps ) ;
      if (NULL != (hMemDC = CreateCompatibleDC( hDC )))
      {
        hBitMap = LoadBitmap( GETHINST( hDlg ),
                      MAKEINTRESOURCE( TTYBITMAP ) ) ;
        hBitMap = SelectObject( hMemDC, hBitMap ) ;
        BitBlt( hDC, 10, 10, 64, 64, hMemDC, 0, 0, SRCCOPY ) ;
        DeleteObject( SelectObject( hMemDC, hBitMap ) ) ;
        DeleteDC( hMemDC ) ;
      }
      EndPaint( hDlg, &ps ) ;
    }
    break ;
endif case WM_COMMAND:
      if ((WORD) wParam == IDD_OK)
      {
        EndDialog( hDlg, TRUE ) ;
        return ( TRUE ) ;
      }
      break;
  }
  return ( FALSE ) ;

}// end of AboutDlgProc()

//-----------------------------------------------------------------
// BOOL NEAR SettingsDlgInit( HWND hDlg )
//
// Description:
//    Puts current settings into dialog box (via CheckRadioButton() etc.)
//
// Parameters:
//    HWND hDlg
//       handle to dialog box
//
//-----------------------------------------------------------------
```

APPENDIX A: Page 32

```c
BOOL NEAR SettingsDlgInit( HWND hDlg )
{
    char    szBuffer[ MAXLEN_TEMPSTR ], szTemp[ MAXLEN_TEMPSTR ] ;
    NPTTYINFO  npTTYInfo ;
    WORD    wCount, wMaxCOM, wPosition ;

if (NULL = = (npTTYInfo = (NPTTYINFO) GET_PROP( hDlg, ATOM_TTYINFO )))
        return ( FALSE ) ;

wMaxCOM = LOWORD( EscapeCommFunction( NULL, GETMAXCOM ) ) + 1 ;

// load the COM prefix from resources

LoadString( GETHINST( hDlg ), IDS_COMPREFIX, szTemp, sizeof( szTemp ) ) ;

// fill port combo box and make initial selection for (wCount = 0; wCount < wMaxCOM; wCount+ +)
    {
        wsprintf( szBuffer, "%s%d", (LPSTR) szTemp, wCount + 1 ) ;
        SendDlgItemMessage( hDlg, IDD_PORTCB, CB_ADDSTRING, NULL,
                    (LPARAM) (LPSTR) szBuffer ) ;
    }

SendDlgItemMessage( hDlg, IDD_PORTCB, CB_SETCURSEL,
                (WPARAM) PORT(npTTYInfo)-1 , NULL ) ;

for (wCount = 0; wCount < 2; wCount+ +)
    {
        wsprintf( szBuffer, "%d", wCount ) ;
        wPosition = LOWORD( SendDlgItemMessage( hDlg, IDD_BAUDCB,
                            CB_ADDSTRING, NULL,
                            (LPARAM) (LPSTR) szBuffer ) ) ;
    }
    SendDlgItemMessage( hDlg, IDD_BAUDCB, CB_SETCURSEL,
                (WPARAM)BAUDRATE(npTTYInfo), NULL ) ;

// fill data bits combo box and make initial selection for (wCount = 0; wCount < 2; wCount+ +)
    {
        wsprintf( szBuffer, "%d", wCount ) ;
        wPosition = LOWORD( SendDlgItemMessage( hDlg, IDD_DATABITSCB,
```

APPENDIX A: Page 33

```
                              CB_ADDSTRING, NULL,
                              (LPARAM) (LPSTR) szBuffer ) ) ;
   }
   SendDlgItemMessage( hDlg, IDD_DATABITSCB, CB_SETCURSEL,
                  (WPARAM)BYTESIZE(npTTYInfo), NULL ) ;

// fill data bits combo box and make initial selection for (wCount = 0; wCount < 2; wCount++)
   {
      wsprintf( szBuffer, "%d", wCount ) ;
      wPosition = LOWORD( SendDlgItemMessage( hDlg, IDD_PARITYCB,
                              CB_ADDSTRING, NULL,
                              (LPARAM) (LPSTR) szBuffer ) ) ;
   }
   SendDlgItemMessage( hDlg, IDD_PARITYCB, CB_SETCURSEL,
                  (WPARAM)PARITY(npTTYInfo), NULL ) ;
   // fill data bits combo box and make initial selection for (wCount = 0; wCount < 2; wCount++)
   {
      wsprintf( szBuffer, "%d", wCount ) ;
      wPosition = LOWORD( SendDlgItemMessage( hDlg, IDD_STOPBITSCB,
                              CB_ADDSTRING, NULL,
                              (LPARAM) (LPSTR) szBuffer ) ) ;
   }
   SendDlgItemMessage( hDlg, IDD_STOPBITSCB, CB_SETCURSEL,
                  STOPBITS(npTTYInfo), NULL ) ;

SendDlgItemMessage( hDlg, IDC_COMMANDLINEEDIT, WM_SETTEXT,
                  NULL, (LPARAM)(LPSTR) COMMANDLINE( npTTYInfo) ) ;

return ( TRUE ) ;

}// end of SettingsDlgInit()

//-----------------------------------------------------------------
// BOOL NEAR SelectTTYFont( HWND hDlg )
//
// Description:
//    Selects the current font for the TTY screen.
//    Uses the Common Dialog ChooseFont() API.
//
```

APPENDIX A: Page 34

```
// Parameters:
//    HWND hDlg
//       handle to settings dialog
//
//-----------------------------------------------------------------------

BOOL NEAR SelectTTYFont( HWND hDlg )
{
  CHOOSEFONT  cfTTYFont ;
  NPTTYINFO   npTTYInfo ;

if (NULL = = (npTTYInfo = (NPTTYINFO) GET_PROP( hDlg, ATOM_TTYINFO )))
     return ( FALSE ) ;

cfTTYFont.lStructSize   = sizeof( CHOOSEFONT ) ;
  cfTTYFont.hwndOwner     = hDlg ;
  cfTTYFont.hDC           = NULL ;
  cfTTYFont.rgbColors     = FGCOLOR( npTTYInfo ) ;
  cfTTYFont.lpLogFont     = &LFTTYFONT( npTTYInfo ) ;
  cfTTYFont.Flags         = CF_SCREENFONTS | CF_FIXEDPITCHONLY |
                            CF_EFFECTS | CF_INITTOLOGFONTSTRUCT ;
  cfTTYFont.lCustData     = NULL ;
  cfTTYFont.lpfnHook      = NULL ;
  cfTTYFont.lpTemplateName = NULL ;
  cfTTYFont.hInstance     = GETHINST( hDlg ) ;

if (ChooseFont( &cfTTYFont ))
  {
    FGCOLOR( npTTYInfo ) = cfTTYFont.rgbColors ;
    ResetTTYScreen( GetParent( hDlg ), npTTYInfo ) ;
  } return ( TRUE ) ;

}// end of SelectTTYFont()

//-----------------------------------------------------------------------
// BOOL NEAR SettingsDlgTerm( HWND hDlg )
//
// Description:
//    Puts dialog contents into TTY info structure.
//
// Parameters:
//    HWND hDlg
```

APPENDIX A: Page 35

```c
//      handle to settings dialog
//
//-------------------------------------------------------------------

BOOL NEAR SettingsDlgTerm( HWND hDlg )
{
  NPTTYINFO    npTTYInfo ;
  WORD         wSelection ;
  WORD         cbText;
  unsigned char szBuf[128];
  FILE         *f_out;

if (NULL == (npTTYInfo = (NPTTYINFO) GET_PROP( hDlg, ATOM_TTYINFO )))
    return ( FALSE ) ;

if((f_out = fopen("COMM.CFG","w")) == NULL)
    return ( FALSE ) ;

// get port selection
  PORT( npTTYInfo ) =
    LOBYTE( LOWORD( SendDlgItemMessage( hDlg, IDD_PORTCB,
                        CB_GETCURSEL,
                        NULL, NULL ) ) + 1 ) ;
  fprintf(f_out, "%d\r\n",PORT( npTTYInfo ));
  // get baud rate selection wSelection =
    LOWORD( SendDlgItemMessage( hDlg, IDD_BAUDCB, CB_GETCURSEL,
                        NULL, NULL ) ) ;

fprintf(f_out, "%d\r\n", wSelection );
  BAUDRATE( npTTYInfo ) =
    LOWORD( SendDlgItemMessage( hDlg, IDD_BAUDCB, CB_GETCURSEL,
                        (WPARAM) wSelection, NULL ) ) ;

// get data bits selection

BYTESIZE( npTTYInfo )  =
    LOBYTE( LOWORD( SendDlgItemMessage( hDlg, IDD_DATABITSCB,
                        CB_GETCURSEL,
                        NULL, NULL ))) ;
  fprintf(f_out, "%d\r\n", wSelection);
```

APPENDIX A: Page 36

```c
// get parity selection wSelection =
    LOWORD( SendDlgItemMessage( hDlg, IDD_PARITYCB, CB_GETCURSEL,
                    NULL, NULL ) ) ;
PARITY( npTTYInfo ) =
    LOBYTE( LOWORD( SendDlgItemMessage( hDlg, IDD_PARITYCB,
                    CB_GETITEMDATA,
                    (WPARAM) wSelection,
                    NULL ) ) ) ;
fprintf(f_out, "%d\r\n", wSelection );

// get stop bits selection wSelection =
    LOWORD( SendDlgItemMessage( hDlg, IDD_STOPBITSCB, CB_GETCURSEL,
                    NULL, NULL ) ) ;
STOPBITS( npTTYInfo ) =
    LOBYTE( LOWORD( SendDlgItemMessage( hDlg, IDD_STOPBITSCB,
                    CB_GETITEMDATA,
                    (WPARAM) wSelection, NULL ) ) ) ;
fprintf(f_out, "%d\r\n", wSelection );
// jj

*(WORD *) szBuf = sizeof(szBuf) - 1; /* sets the buffer size   */
cbText = (WORD) SendDlgItemMessage(hDlg, IDC_COMMANDLINEEDIT,
    EM_GETLINE,
    0,              /* line number        */
    (DWORD) (LPSTR) szBuf);   /* buffer address        */
szBuf[cbText] = '\0';        /* terminating null character */
strcpy(npTTYInfo->CommandLine , szBuf);

fputs( szBuf, f_out);
fclose(f_out);
//jj
// get flow control settings return ( TRUE ) ;

}// end of SettingsDlgTerm()

//-------------------------------------------------------------------------
//  BOOL FAR PASCAL __export SettingsDlgProc( HWND hDlg, UINT uMsg,
```

APPENDIX A: Page 37

```c
//                      WPARAM wParam, LPARAM lParam )
//
// Description:
//    This handles all of the user preference settings for
//    the TTY.
//
// Parameters:
//    same as all dialog procedures
//
//-----------------------------------------------------------------------

BOOL FAR PASCAL __export SettingsDlgProc( HWND hDlg, UINT uMsg,
                        WPARAM wParam, LPARAM lParam )
{
   switch (uMsg)
   {
      case WM_INITDIALOG:
      {
         NPTTYINFO  npTTYInfo ;

// get & save pointer to TTY info structure npTTYInfo = (NPTTYINFO) LOWORD( lParam ) ;
         SET_PROP( hDlg, ATOM_TTYINFO, (HANDLE) npTTYInfo ) ;

return ( SettingsDlgInit( hDlg ) ) ;
      } case WM_COMMAND:
         switch ((WORD) wParam)
         {
            case IDD_FONT:
               return ( SelectTTYFont( hDlg ) ) ;

case IDD_OK:
               // Copy stuff into structure
               SettingsDlgTerm( hDlg ) ;
               EndDialog( hDlg, TRUE ) ;
               return ( TRUE ) ;

case IDD_CANCEL:
               // Just end
               EndDialog( hDlg, TRUE ) ;
               return ( TRUE ) ;
```

APPENDIX A: Page 38

```
      }
      break;

case WM_DESTROY:
      REMOVE_PROP( hDlg, ATOM_TTYINFO ) ;
      break ;
   }
   return ( FALSE ) ;

}// end of SettingsDlgProc()
//------------------------------------------------------------------
// BOOL NEAR PaintTTY( HWND hWnd )
//
// Description:
//    Paints the rectangle determined by the paint struct of
//    the DC.
//
// Parameters:
//    HWND hWnd
//       handle to TTY window (as always)
//
//------------------------------------------------------------------

BOOL NEAR PaintTTY( HWND hWnd )
{
   int        nRow, nCol, nEndRow, nEndCol, nCount, nHorzPos, nVertPos ;
   HDC        hDC ;
   HFONT      hOldFont ;
   NPTTYINFO  npTTYInfo ;
   PAINTSTRUCT ps ;
   RECT       rect ;

if (NULL == (npTTYInfo = (NPTTYINFO) GetWindowWord( hWnd,
GWW_NPTTYINFO )))
      return ( FALSE ) ;

hDC = BeginPaint( hWnd, &ps ) ;
   hOldFont = SelectObject( hDC, HTTYFONT( npTTYInfo ) ) ;
   SetTextColor( hDC, FGCOLOR( npTTYInfo ) ) ;
   SetBkColor( hDC, GetSysColor( COLOR_WINDOW ) ) ;
   rect = ps.rcPaint ;
   nRow =
      min( MAXROWS - 1,
         max( 0, (rect.top + YOFFSET( npTTYInfo )) / YCHAR( npTTYInfo ) ) ) ;
```

APPENDIX A: Page 39

```
    nEndRow =
      min( MAXROWS - 1,
          ((rect.bottom + YOFFSET( npTTYInfo ) - 1) / YCHAR( npTTYInfo ) ) ) ;
    nCol =
      min( MAXCOLS - 1,
          max( 0, (rect.left + XOFFSET( npTTYInfo )) / XCHAR( npTTYInfo ) ) ) ;
    nEndCol =
      min( MAXCOLS - 1,
          ((rect.right + XOFFSET( npTTYInfo ) - 1) / XCHAR( npTTYInfo ) ) ) ;
    nCount = nEndCol - nCol + 1 ;
    for (; nRow < = nEndRow; nRow++)
    {
      nVertPos = (nRow * YCHAR( npTTYInfo )) - YOFFSET( npTTYInfo ) ;
      nHorzPos = (nCol * XCHAR( npTTYInfo )) - XOFFSET( npTTYInfo ) ;
      rect.top = nVertPos ;
      rect.bottom = nVertPos + YCHAR( npTTYInfo ) ;
      rect.left = nHorzPos ;
      rect.right = nHorzPos + XCHAR( npTTYInfo ) * nCount ;
      SetBkMode( hDC, OPAQUE ) ;
      ExtTextOut( hDC, nHorzPos, nVertPos, ETO_OPAQUE | ETO_CLIPPED, &rect,
              (LPSTR)( SCREEN( npTTYInfo ) + nRow * MAXCOLS + nCol ),
              nCount, NULL ) ;
    }
    SelectObject( hDC, hOldFont ) ;
    EndPaint( hWnd, &ps ) ;
    MoveTTYCursor( hWnd ) ;
    return ( TRUE ) ;

}// end of PaintTTY()

//-----------------------------------------------------------------------
// BOOL NEAR SizeTTY( HWND hWnd, WORD wVertSize, WORD wHorzSize )
//
// Description:
//    Sizes TTY and sets up scrolling regions.
//
// Parameters:
//    HWND hWnd
//       handle to TTY window
//
//    WORD wVertSize
//       new vertical size
//
//    WORD wHorzSize
```

APPENDIX A: Page 40

```
//       new horizontal size
//
//-----------------------------------------------------------------------

BOOL NEAR SizeTTY( HWND hWnd, WORD wVertSize, WORD wHorzSize )
{
   int      nScrollAmt ;
   NPTTYINFO npTTYInfo ;

if (NULL = = (npTTYInfo = (NPTTYINFO) GetWindowWord( hWnd,
GWW_NPTTYINFO )))
       return ( FALSE ) ;

YSIZE( npTTYInfo ) = (int) wVertSize ;
   YSCROLL( npTTYInfo ) = max( 0, (MAXROWS * YCHAR( npTTYInfo )) -
                  YSIZE( npTTYInfo ) ) ;
   nScrollAmt = min( YSCROLL( npTTYInfo ), YOFFSET( npTTYInfo ) ) -
            YOFFSET( npTTYInfo ) ;
   ScrollWindow( hWnd, 0, -nScrollAmt, NULL, NULL ) ;

YOFFSET( npTTYInfo ) = YOFFSET( npTTYInfo ) + nScrollAmt ;
   SetScrollPos( hWnd, SB_VERT, YOFFSET( npTTYInfo ), FALSE ) ;
   SetScrollRange( hWnd, SB_VERT, 0, YSCROLL( npTTYInfo ), TRUE ) ;

XSIZE( npTTYInfo ) = (int) wHorzSize ;
   XSCROLL( npTTYInfo ) = max( 0, (MAXCOLS * XCHAR( npTTYInfo )) -
                  XSIZE( npTTYInfo ) ) ;
   nScrollAmt = min( XSCROLL( npTTYInfo ), XOFFSET( npTTYInfo )) -
            XOFFSET( npTTYInfo ) ;
   ScrollWindow( hWnd, 0, -nScrollAmt, NULL, NULL ) ;
   XOFFSET( npTTYInfo ) = XOFFSET( npTTYInfo ) + nScrollAmt ;
   SetScrollPos( hWnd, SB_HORZ, XOFFSET( npTTYInfo ), FALSE ) ;
   SetScrollRange( hWnd, SB_HORZ, 0, XSCROLL( npTTYInfo ), TRUE ) ;

InvalidateRect( hWnd, NULL, TRUE ) ;

return ( TRUE ) ;

}// end of SizeTTY()

//-----------------------------------------------------------------------
// BOOL NEAR ScrollTTYVert( HWND hWnd, WORD wScrollCmd, WORD wScrollPos
)
//
```

APPENDIX A: Page 41

```
//  Description:
//      Scrolls TTY window vertically.
//
//  Parameters:
//      HWND hWnd
//          handle to TTY window
//
//      WORD wScrollCmd
//          type of scrolling we're doing
//
//      WORD wScrollPos
//          scroll position
//
//-----------------------------------------------------------------

BOOL NEAR ScrollTTYVert( HWND hWnd, WORD wScrollCmd, WORD wScrollPos )
{
    int        nScrollAmt ;
    NPTTYINFO  npTTYInfo ;

if (NULL == (npTTYInfo = (NPTTYINFO) GetWindowWord( hWnd,
GWW_NPTTYINFO )))
        return ( FALSE ) ;

switch (wScrollCmd)
    {
      case SB_TOP:
        nScrollAmt = -YOFFSET( npTTYInfo ) ;
        break ;

case SB_BOTTOM:
        nScrollAmt = YSCROLL( npTTYInfo ) - YOFFSET( npTTYInfo ) ;
        break ;

case SB_PAGEUP:
        nScrollAmt = -YSIZE( npTTYInfo ) ;
        break ;

case SB_PAGEDOWN:
        nScrollAmt = YSIZE( npTTYInfo ) ;
        break ;

case SB_LINEUP:
        nScrollAmt = -YCHAR( npTTYInfo ) ;
```

APPENDIX A: Page 42

```
    break ;

case SB_LINEDOWN:
    nScrollAmt = YCHAR( npTTYInfo ) ;
    break ;

case SB_THUMBPOSITION:
    nScrollAmt = wScrollPos - YOFFSET( npTTYInfo ) ;
    break ;

default:
    return ( FALSE ) ;
  }
  if ((YOFFSET( npTTYInfo ) + nScrollAmt) > YSCROLL( npTTYInfo ))
    nScrollAmt = YSCROLL( npTTYInfo ) - YOFFSET( npTTYInfo ) ;
  if ((YOFFSET( npTTYInfo ) + nScrollAmt) < 0)
    nScrollAmt = -YOFFSET( npTTYInfo ) ;
  ScrollWindow( hWnd, 0, -nScrollAmt, NULL, NULL ) ;
  YOFFSET( npTTYInfo ) = YOFFSET( npTTYInfo ) + nScrollAmt ;
  SetScrollPos( hWnd, SB_VERT, YOFFSET( npTTYInfo ), TRUE ) ;

return ( TRUE ) ;

}// end of ScrollTTYVert()

//----------------------------------------------------------------------
//  BOOL NEAR ScrollTTYHorz( HWND hWnd, WORD wScrollCmd, WORD wScrollPos )
//
//  Description:
//     Scrolls TTY window horizontally.
//
//  Parameters:
//     HWND hWnd
//        handle to TTY window
//
//     WORD wScrollCmd
//        type of scrolling we're doing
//
//     WORD wScrollPos
//        scroll position
//
//----------------------------------------------------------------------
```

APPENDIX A: Page 43

```c
BOOL NEAR ScrollTTYHorz( HWND hWnd, WORD wScrollCmd, WORD wScrollPos )
{
  int      nScrollAmt ;
  NPTTYINFO  npTTYInfo ;

if (NULL == (npTTYInfo = (NPTTYINFO) GetWindowWord( hWnd,
GWW_NPTTYINFO )))
      return ( FALSE ) ;

switch (wScrollCmd)
  {
    case SB_TOP:
      nScrollAmt = -XOFFSET( npTTYInfo ) ;
      break ;

case SB_BOTTOM:
      nScrollAmt = XSCROLL( npTTYInfo ) - XOFFSET( npTTYInfo ) ;
      break ;

case SB_PAGEUP:
      nScrollAmt = -XSIZE( npTTYInfo ) ;
      break ;

case SB_PAGEDOWN:
      nScrollAmt = XSIZE( npTTYInfo ) ;
      break ;

case SB_LINEUP:
      nScrollAmt = -XCHAR( npTTYInfo ) ;
      break ;

case SB_LINEDOWN:
      nScrollAmt = XCHAR( npTTYInfo ) ;
      break ;

case SB_THUMBPOSITION:
      nScrollAmt = wScrollPos - XOFFSET( npTTYInfo ) ;
      break ;

default:
      return ( FALSE ) ;
  }
  if ((XOFFSET( npTTYInfo ) + nScrollAmt) > XSCROLL( npTTYInfo ))
    nScrollAmt = XSCROLL( npTTYInfo ) - XOFFSET( npTTYInfo ) ;
```

APPENDIX A: Page 44

```
  if ((XOFFSET( npTTYInfo ) + nScrollAmt) < 0)
    nScrollAmt = -XOFFSET( npTTYInfo ) ;
  ScrollWindow( hWnd, -nScrollAmt, 0, NULL, NULL ) ;
  XOFFSET( npTTYInfo ) = XOFFSET( npTTYInfo ) + nScrollAmt ;
  SetScrollPos( hWnd, SB_HORZ, XOFFSET( npTTYInfo ), TRUE ) ;

return ( TRUE ) ;

}// end of ScrollTTYHorz()

//-----------------------------------------------------------------
//  BOOL NEAR SetTTYFocus( HWND hWnd )
//
//  Description:
//     Sets the focus to the TTY window also creates caret.
//
//  Parameters:
//     HWND hWnd
//        handle to TTY window
//
//-----------------------------------------------------------------

BOOL NEAR SetTTYFocus( HWND hWnd )
{
  NPTTYINFO  npTTYInfo ;

if (NULL == (npTTYInfo = (NPTTYINFO) GetWindowWord( hWnd,
GWW_NPTTYINFO )))
     return ( FALSE ) ;

if (CONNECTED( npTTYInfo ) && (CURSORSTATE( npTTYInfo ) != CS_SHOW))
  {
    CreateCaret( hWnd, NULL, XCHAR( npTTYInfo ), YCHAR( npTTYInfo ) ) ;
    ShowCaret( hWnd ) ;
    CURSORSTATE( npTTYInfo ) = CS_SHOW ;
  }
  MoveTTYCursor( hWnd ) ;
  return ( TRUE ) ;

}// end of SetTTYFocus()

//-----------------------------------------------------------------
//  BOOL NEAR KillTTYFocus( HWND hWnd )
//
```

APPENDIX A: Page 45

```
// Description:
//    Kills TTY focus and destroys the caret.
//
// Parameters:
//    HWND hWnd
//       handle to TTY window
//
//-----------------------------------------------------------------

BOOL NEAR KillTTYFocus( HWND hWnd )
{
  NPTTYINFO npTTYInfo ;

if (NULL == (npTTYInfo = (NPTTYINFO) GetWindowWord( hWnd,
GWW_NPTTYINFO )))
      return ( FALSE ) ;

if (CONNECTED( npTTYInfo ) && (CURSORSTATE( npTTYInfo ) != CS_HIDE))
  {
    HideCaret( hWnd ) ;
    DestroyCaret() ;
    CURSORSTATE( npTTYInfo ) = CS_HIDE ;
  }
  return ( TRUE ) ;

}// end of KillTTYFocus()

//-----------------------------------------------------------------
// BOOL NEAR MoveTTYCursor( HWND hWnd )
//
// Description:
//    Moves caret to current position.
//
// Parameters:
//    HWND hWnd
//       handle to TTY window
//
//-----------------------------------------------------------------

BOOL NEAR MoveTTYCursor( HWND hWnd )
{
  NPTTYINFO npTTYInfo ;
```

APPENDIX A: Page 46

```c
    if (NULL == (npTTYInfo = (NPTTYINFO) GetWindowWord( hWnd,
GWW_NPTTYINFO )))
        return ( FALSE ) ;

if (CONNECTED( npTTYInfo ) && (CURSORSTATE( npTTYInfo ) & CS_SHOW))
        SetCaretPos( (COLUMN( npTTYInfo ) * XCHAR( npTTYInfo )) -
                XOFFSET( npTTYInfo ),
                (ROW( npTTYInfo ) * YCHAR( npTTYInfo )) -
                YOFFSET( npTTYInfo ) ) ;

return ( TRUE ) ;

}// end of MoveTTYCursor()

int Read_File(HWND hWnd)
{
    FILE *f_in;
    NPTTYINFO npTTYInfo ;
    int wSelection;
    char buff[128];

if (NULL == (npTTYInfo = (NPTTYINFO) GetWindowWord( hWnd,
GWW_NPTTYINFO )))
        return ( FALSE ) ;

if(NULL == (f_in = fopen("comm.cfg","r")))
        return (FALSE);

fscanf(f_in, "%d", (int *)&wSelection);
    PORT( npTTYInfo ) = wSelection;
    fscanf(f_in, "%d", (int *)&wSelection);
    BAUDRATE( npTTYInfo )= wSelection;
    fscanf(f_in, "%d", (int *)&wSelection);
    BYTESIZE( npTTYInfo ) = wSelection;
    fscanf(f_in, "%d", (int *)&wSelection);
    PARITY( npTTYInfo )= wSelection;
    fscanf(f_in, "%d", (int *)&wSelection);
    STOPBITS( npTTYInfo )= wSelection;
    fscanf(f_in, "%s" , buff );
    strcpy(npTTYInfo->CommandLine, buff);

fclose(f_in);
    return (TRUE);
}
```

APPENDIX A: Page 47

```
//------------------------------------------------------------------
//  End of File: monitor.c
//------------------------------------------------------------------
```

What is claimed:

1. A method of triggering a program stored at a host computer system using a telephone ring signal, wherein the host system includes a ring detection circuit connected to a phone line, the method comprising the steps of:
   (a) dialing the telephone number of the phone line connected to the host system, thereby generating a ring signal on the phone line;
   (b) detecting the ring signal on the phone line using a ring detection circuit, and then generating a trigger signal to the host system indicating a phone call has been detected; and
   (c) the host system receiving the trigger signal and executing a predetermined program stored at the host system, wherein the predetermined program executed by the host system creates a connection between the host system and the Internet using a communication device connected to the host system.

2. The method of claim 1, further including the steps of:
   (d) storing a plurality of predetermined programs at the host system, wherein at least one of the programs creates a connection between the host system and the Internet; and
   (e) transmitting a trigger identification code after dialing the telephone number, the trigger identification code identifying which predetermined program is to be triggered for execution.

3. The method according to claim 1, further including the step of
   (d) a remote user then utilizing a local computer system to create a connection to the host computer via the Internet.

4. The method of claim 1, further including the steps of:
   (d) transmitting a user validation code to the host system after dialing the telephone number;
   (e) the host system then determining whether the transmitted user validation code is valid; and
   (f) if the user validation code is valid, then executing the predetermined program stored at the host system; and
   (g) if the user validation code is not valid, then not executing the predetermined program stored at the host system.

5. The method of claim 4, further including the step of:
   (h) transmitting a tone sequence onto the phone line if the user validation code is valid.

6. A system for triggering a host computer system to connect to the Internet upon detection of an incoming telephone call, the system comprising:
   (a) a host computer system including:
      (1) a communications device connected between the host computer system and a communications network;
      (2) at least one activation program stored at the host computer system, wherein the at least one activation program includes a script of commands that causes the host computer system to connect to the Internet using the communications device; and
      (3) a control signal monitor program that detects a trigger signal and then causes the at least one activation program to be executed by the host computer system; and
   (b) a ring detection and triggering circuit connected between the host computer system and a phone line, the circuit including a ring detector that detects a ring signal on the phone line and a trigger circuit for generating the trigger signal to the host computer system when the ring signal is detected, thereby triggering execution of the at least one activation program stored at the host computer system.

7. The system according to claim 6, wherein multiple activation programs are stored at the host computer system, and wherein a numeric value transmitted on the phone line indicates the activation program to be executed, said value being transmitted to the host computer system along with the trigger signal in order to enable execution of the indicated program.

8. The system according to claim 6, further including means for authenticating a user validation sequence transmitted on the phone line and for only triggering execution of the activation program upon authentication of the transmitted sequence.

9. The system according to claim 8, wherein the ring detection and triggering circuit further includes tone generating circuitry activated upon receipt of an authenticated user validation sequence, said tone generating circuitry generating a sequence of tones onto the phone line to indicate successful triggering of the system.

10. The system of claim 6, wherein the trigger circuit includes a one-shot timer connected between the ring detector and the host computer system, the one-shot timer responsive to the output of the ring detector for generating a trigger signal to the host computer system having a predetermined pulse width.

11. The system of claim 10, wherein the predetermined pulse width of the trigger signal can be varied by adjusting the value of an RC-network connected to the one-shot timer.

12. The system of claim 6, wherein the ring detection and triggering circuit includes:
   a solid-state data access arrangement (DAA) coupled to the phone line, the DAA including a ring detection circuit;
   a dual tone multi-frequency (DTMF) receiver/transmitter coupled to the DAA;
   a microcontroller connected to the ring detection circuit of the DAA and coupled to the DTMF receiver/transmitter, the microcontroller including an embedded program that detects a ring signal indicator from the ring detection circuit and generates the trigger signal to the host computer; and
   an interface connecting the microcontroller to the host system.

13. A system for triggering at least one program stored at a host computer system connected to a communications network using a ring signal, comprising:
   means for detecting the ring signal on the communications network;
   means for generating a trigger signal to the host computer system indicating that a phone call has been detected;
   means for receiving the trigger signal at the host system; and
   means for executing the program stored at the host system when the trigger signal is received, wherein the program stored at the host system comprises a series of commands that cause the host system to connect to the Internet.

14. The system of claim 13, further comprising:
   means for validating a user's authority to trigger the at least one program prior to execution.

15. The system of claim 13, further comprising:
   a plurality of programs stored at the host computer system;

trigger identification code means for selecting one of the plurality of programs to be triggered for execution; and means for receiving said trigger identification code means and for determining which one of the plurality of programs to execute.

16. The system of claim 14, further comprising:

means for transmitting a signal back to the user indicating that the user's authority to trigger the at least one program has been validated.

\* \* \* \* \*